United States Patent [19]
Patel et al.

[11] Patent Number: 6,124,898
[45] Date of Patent: Sep. 26, 2000

[54] DIGITAL TELEVISION RECEIVER WITH EQUALIZATION PERFORMED ON DIGITAL INTERMEDIATE-FREQUENCY SIGNALS

[75] Inventors: Chandrakant B. Patel, Hopewell, N.J.; Allen LeRoy Limberg, Vienna, Va.

[73] Assignee: Samsung Elctronics Co., Ltd., Kyungki-Do, Rep. of Korea

[21] Appl. No.: 09/335,516

[22] Filed: Jun. 18, 1999

Related U.S. Application Data

[60] Provisional application No. 60/089,884, Jun. 19, 1998, and provisional application No. 60/125,384, Mar. 22, 1999.

[51] Int. Cl.[7] .......................... H04N 5/213; H04N 5/455
[52] U.S. Cl. ......................... 348/607; 348/614; 348/641; 348/726; 348/731
[58] Field of Search .................................... 348/507, 508, 348/914, 536, 607, 611, 614, 624, 638, 639, 641, 725, 726, 727, 731, 735; 375/229, 230, 232, 233, 348, 350; H04N 5/21, 5/213, 5/455, 5/44

[56] References Cited

U.S. PATENT DOCUMENTS 5,796,786  8/1998  Lee ......................................... 348/607

*Primary Examiner*—Sherrie Hsia
*Attorney, Agent, or Firm*—Sughrue, Mion, Zinn, Macpeak & Seas, PLLC

[57] ABSTRACT

A digital television signal receiver in a television set or in a digital video recorder digitizes received digital television signal as converted in frequency to a final intermediate-frequency band close to baseband, then performs equalization filtering on the digitized signal before demodulating it in the digital regime to regenerate baseband symbol coding. The equalization filtering is adaptive, and weighting coefficients for this filtering are adjusted in response to portions of the regenerated baseband symbol coding. Initial adjustment of the weighting coefficients is preferably done using selected portions of the data field synchronizing signal as a ghost cancellation reference signal, in order that convergence of the weighting coefficients to desired values proceeds more rapidly. Thereafter, adjustment of the weighting coefficients is preferably done using decision-directed methods that are continuously employed on all regenerated baseband symbols, better to track changing multipath conditions should they occur.

7 Claims, 14 Drawing Sheets

DIGITAL TELEVISION RECEIVER WITH EQUALIZATION PERFORMED ON DIGITAL INTERMEDIATE-FREQUENCY SIGNALS

This application is filed under 35 U.S.C. 111(a) claiming pursuant to 35 U.S.C. 119(e)(1) benefit of the filing date of provisional application Ser. No. 60/089,884 filed Jun. 19, 1998, pursuant to 35 U.S.C. 111(b) and of provisional application Ser. No. 60/125,384 filed Mar. 22, 1999, pursuant to 35 U.S.C. 111(b).

The present invention relates to receivers for digital television (DTV) signals, such as those employed for terrestrial broadcasting in the United States of America in accordance with the Advanced Television Systems Committee (ATSC) standard, and more particularly, to passband equalizers for digitized final-intermediate-frequency vestigial-sideband DTV signals in such receivers.

BACKGROUND OF THE INVENTION

Multi-path reception conditions give rise to ghosts in NTSC television reception. Ghost signals which arrive over a transmission path of lesser length than the strongest or "principal" signal are referred to as "pre-ghosts", and the ghost images they cause in a received television image appear to the left of the desired image. Pre-ghosts occurring in off-the-air reception can be displaced as much as 6 microseconds from the "principal" signal, but typically displacements are no more than 2 microseconds. In cable reception direct off-the-air pick-up can precede the cable-supplied signal by as much as 30 microseconds, however. Ghost signals which arrive over a transmission path of greater length than the strongest or "principal" signal are referred to as "post-ghosts", and the ghost images they cause in a received TV image appear to the right of the desired image. Typically, the range for post-ghosts extends to 40 microseconds displacement from the "principal" signal, with 70% or so of post-ghosts occurring in a subrange that extends to 10 microseconds displacement.

In cable reception the differential delays that ghosts exhibit with respect to the principal received signal are usually very short, leading to departure from flat amplitude response and uniform group delay in the transmission/reception channel. These ghosts are referred to as "micro-ghosts" to distinguish them from "macro-ghosts" exhibiting longer differential delays of at least a microsecond with respect to the principal received signal that are encountered in terrestrial broadcast DTV signals received over the air.

Equalization filtering can be carried out using a multiple-tap finite-impulse-response (FIR) digital filter. The weighting coefficients of such a filter can be adjusted to suppress the responses to multi-path signals which exhibit differential delay with respect to the principal received signal. Since macro-ghosts are generally spaced apart from each other and from the principal received signal, it is a common practice to use filters with sparsely weighted coefficients for suppressing them, cascading such filters FIR filters with more densely weighted coefficients used for suppressing micro-ghosts. The filters with sparsely weighted coefficients are sometimes referred to as ghost-reduction filters, and the filters with more densely weighted coefficients are sometimes referred to as equalization filters. In this specification the term "channel equalization filtering" is used generically to refer to both types of filter and to cascade connections of such filters. Often the ghost-reduction filters with sparsely weighted coefficients are themselves cascade connections of an infinite-impulse-response (IIR) recursive digital filter and an FIR digital filter, each comprised of programmable bulk delay elements between successive taps from which differentially delayed signals are extracted for programmable weighting in weighted summation digital filtering procedures. Procedures for adjusting the coefficients of cascaded ghost-reduction and micro-ghost equalization filters are described by C. B. Patel and J. Yang in U.S. Pat. No. 5,331,416 issued Jul. 19, 1994 and entitled "METHODS FOR OPERATING GHOST-CANCELATION CIRCUITRY FOR TV RECEIVER OR VIDEO RECORDER". Apparatus and procedures for accumulating training signals for NTSC analog television signals are described by C. B. Patel and J. Yang in U.S. Pat. No. 5,600,380 issued Feb. 4, 1997 and entitled "GHOST-CANCELATION REFERENCE SIGNAL ACQUISITION CIRCUITRY, AS FOR TV RECEIVER OR VIDEO RECORDER".

Similar multi-path reception conditions obtain in digital television (DTV) systems. The effects of ghosts are not directly observable on the television viewing screen but instead interfere with the data slicing procedures employed to recover data from baseband symbol coding regenerated at the DTV receiver responsive to received DTV signals. Ghost suppression is effected by digital filtering techniques similar to those used with NTSC signals.

Receivers for DTV signals that digitize these signals after conversion to a final intermediate-frequency band and before demodulating the converted signals to regenerate baseband symbol coding are described in the inventors' U.S. Pat. No. 5,479,449 issued Dec. 26, 1995 and entitled "DIGITAL VSB DETECTOR WITH BANDPASS PHASE TRACKER, AS FOR INCLUSION IN AN HDTV RECEIVER". The receivers disclosed in U.S. Pat. No. 5,479,449 include equalization filtering, which is performed on the regenerated baseband symbol coding. U.S. Pat. No. 5,479,449 indicates a preference for adaptive weighting being done dependent on a ghost cancellation reference signal component of the regenerated baseband symbol coding. This method of adaptive weighting is preferred for initial adjustment of weighting in the channel equalization filtering as indicated in the inventors' and others' U.S. Pat. No. 5,648,987 issued Jul. 15, 1997 and entitled "RAPID-UPDATE ADAPTIVE CHANNEL-EQUALIZATION FILTERING FOR DIGITAL RADIO RECEIVERS, SUCH AS HDTV RECEIVERS". Thereafter, as indicated in U.S. Pat. No. 5,479,449 the adaptation of the channel-equalization filtering can be performed on a decision-directed basis using all received symbols, which better permits the tracking of changing multipath conditions.

The inventors point out that performing equalization on the digitized final intermediate-frequency (final-IF) signal, rather than on the regenerated baseband symbol coding, is preferable for a number of reasons. First, there is no spectrum folding of the differentially delayed signals prior to equalization, to complicate equalization of the double-sideband portions of the DTV signal. Second, the appropriate delay of low baseband frequencies is not difficult to implement. Third, the effects of the local oscillator AFPC loop help, rather than interfere with, equalization procedures. Fourth, equalization can be effected on co-channel NTSC as well as on the DTV signals without need for separate equalization filtering, as required if baseband equalization of the two types of signal is to be done; this is helpful when co-channel NTSC signals are to be analyzed for their effects on DTV signals.

Performing equalization on the digitized final intermediate frequency presents the problem that the channel equalization filter response being in the passband is unsuitable for the generation of adjustments to the adaptive weighting coefficients therein. The decision-feedback techniques used in prior art quadrature-amplitude-modulation (QAM) data communications receivers for demodulating the passband equalizer response, generating decision-feedback error signal in the baseband, computing weighting coefficients for a hypothetical baseband equalizer, and then applying lowpass-to-bandpass transformation procedures to generate weighting coefficients for the passband equalizer are inappropriate for VSB data communications receivers because the lowpass-to-bandpass transformation procedure is inapplicable.

SUMMARY OF THE INVENTION

This problem is overcome by adjusting weighting coefficients of adaptive channel equalization filtering responsive to at least portions of the regenerated baseband symbol coding in a digital television receiver which embodies the invention, which digitizes received digital television signal as converted in frequency to a final intermediate-frequency band close to baseband, and which then performs the adaptive channel equalization filtering on the digitized signal before demodulating it in the digital regime to regenerate baseband symbol coding. Except for the intervening demodulation of the channel equalization filtering response the procedures for adjusting the weighting of the adaptive channel equalization filtering resemble ones employed when channel equalization filtering is performed on baseband symbol coding.

Initial adjustment of the weighting coefficients is preferably done using selected portions of the data field synchronizing signal as a ghost cancellation reference signal, in order that convergence of the weighting coefficients to desired values proceeds more rapidly. Thereafter, adjustment of the weighting coefficients is preferably done using decision-directed methods that are continuously employed on all regenerated baseband symbols, better to track changing multipath conditions should they occur.

Preferably, in accordance with a further aspect of the invention, the effects of co-channel interfering signal (if such there be) are suppressed in the regenerated baseband symbol coding, so as not to affect the adjustment of the coefficients of the channel equalization filtering that are made in response to at least portions of the regenerated baseband symbol coding.

DETAILED DESCRIPTION

Figure 1:
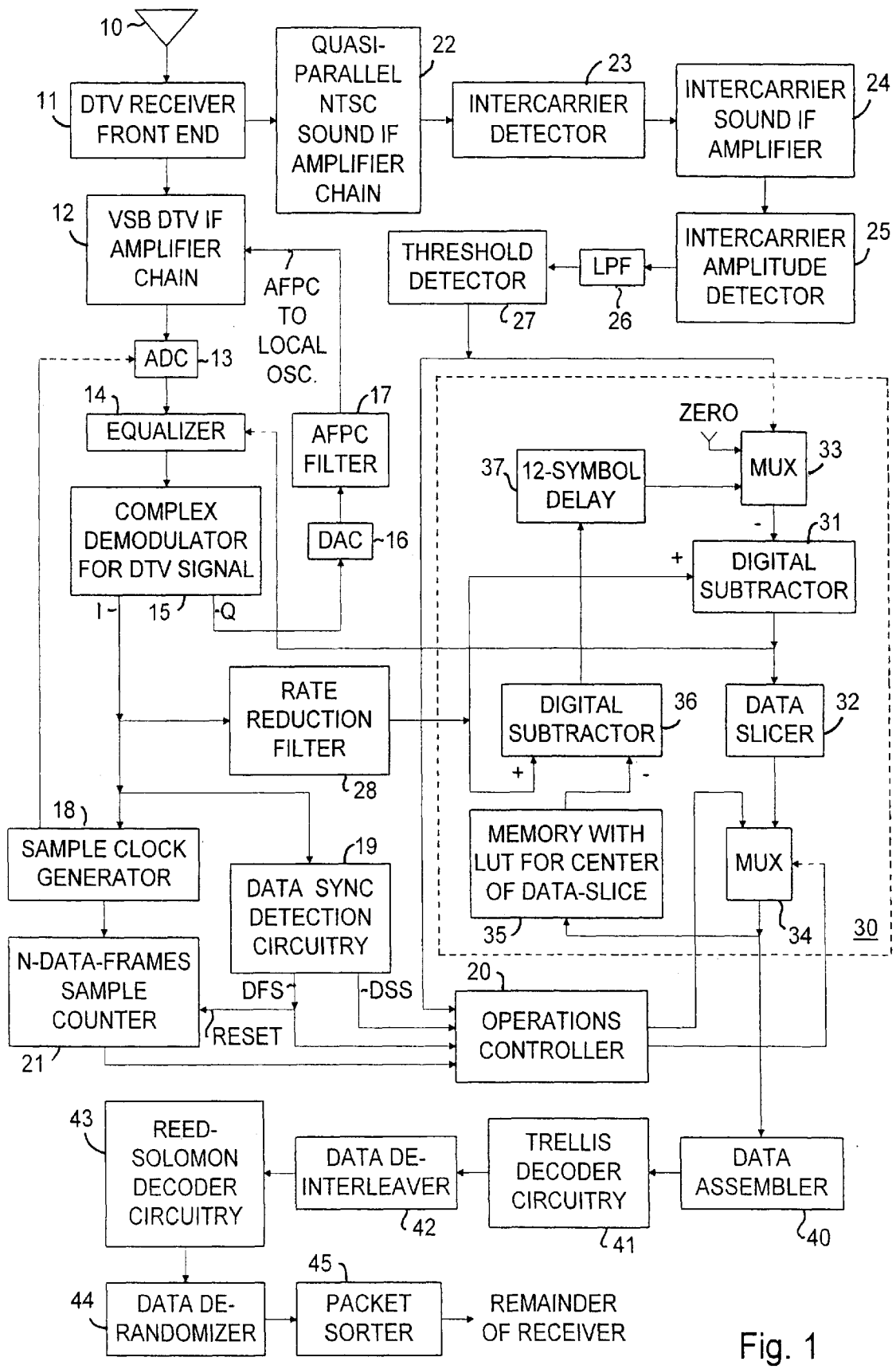
FIG. 1 is a block schematic diagram of a digital television signal receiver embodying the invention, which DTV signal receiver precedes its data-slicer with an adaptive co-channel NTSC artifacts suppression filter that uses a revised estimate of NTSC artifacts accompanying symbol code twelve epochs earlier as a preliminary estimate of NTSC artifacts accompanying current symbol code.

At various points in the circuits shown in the FIGURES of the drawing, shimming delays have to be inserted in order that the sequence of operation is correct, as will be understood by those skilled in electronic design. Unless there is something out of the ordinary about a particular shimming delay requirement, it will not be explicitly referred to in the specification that follows.

FIG. 1 shows a digital television signal receiver used for recovering error-corrected data, which data are suitable for recording by a digital video cassette recorder or for MPEG-2 decoding and display in a television set. The FIG. 1 DTV signal receiver is shown as receiving television broadcast signals from a receiving antenna 10, but can receive the signals from a cable network instead. The television broadcast signals are supplied as input signal to "front end" electronics 11. The "front end" electronics 11 generally include a radio-frequency amplifier and first detector for converting radio-frequency television signals to intermediate-frequency television signals, supplied as input signal to an intermediate-frequency (IF) amplifier chain 12 for vestigial-sideband DTV signals. The DTV receiver is preferably of plural-conversion type with the IF amplifier chain 12 including an IF amplifier for amplifying DTV signals as converted to an ultra-high-frequency band by the first detector, a second detector for converting the amplified DTV signals to a very-high-frequency band, and a further IF amplifier for amplifying DTV signals as converted to the VHF band. Since demodulation to baseband is performed in the digital regime, the IF amplifier chain 12 further includes a third detector for converting the amplified DTV signals to a final intermediate-frequency band closer to baseband for digitization by an analog-to-digital converter 13. This final-IF band reposes in the high-frequency (HF) band or overlaps the medium-frequency (MF) and HF bands.

Preferably, a surface-acoustic-wave (SAW) filter is used in the IF amplifier for the UHF band, to shape channel selection response and reject adjacent channels. This SAW filter cuts off rapidly just beyond 5.38 MHz remove from the suppressed carrier frequency of the VSB DTV signal and the pilot carrier, which is of like frequency and of fixed amplitude. This SAW filter accordingly rejects much of the frequency-modulated sound carrier of any co-channel interfering analog TV signal. Removing the FM sound carrier of any co-channel interfering analog TV signal in the IF amplifier chain 12 prevents artifacts of that carrier being generated when the final intermediate-frequency signal is detected to recover baseband symbols and forestalls such artifacts interfering with data-slicing of those baseband symbols during symbol decoding. The prevention of such artifacts interfering with data-slicing of those baseband symbols during symbol decoding is better than can be accomplished by certain types of comb-filtering before data-slicing.

The final IF output signals from the IF amplifier chain 12 as digitized by the ADC 13 are supplied to equalizer circuitry 14. A complex demodulator 15 demodulates the equalized vestigial-sideband amplitude-modulation DTV signal in the final intermediate-frequency band to recover an I-channel baseband signal by digital in-phase synchronous detection and a Q-channel baseband signal by digital quadrature-phase synchronous detection. The Q-channel baseband signal is converted to analog form by a digital-to-analog converter 16, and the resulting analog signal is filtered by a lowpass filter 17 to develop an automatic frequency and phase control (AFPC) signal for controlling the frequency and phase of a local oscillator developing oscillations for use in the frequency downconversion procedures carried out in the IF amplifier chain 12. The AFPC of this local oscillator reduces the lower-frequency Q-channel baseband signal samples to arithmetic zero values. The time constant of the lowpass filter 17 is long enough to suppress any oscillatory tendency in the AFPC loop arising from delay in the equalizer circuitry 14. Since delays shorter than 40 microseconds or so are generally of concern, the lowpass filter 17 can have a passband as wide as one or two kilohertz, sufficient to permit the AFPC of a local oscillator with crystal-stabilized natural frequency.

The equalizer circuitry 14 shown in FIGS. 1–9 can be constructed in integrated circuit form as a multiple-tap finite-impulse-response digital filter used for amplitude-and-group-delay equalization, the tap weights of which FIR filter are programmable; circuitry for selectively accumulating a training signal and temporarily storing the accumulation results; and a microcomputer for comparing the temporarily stored accumulation results with an ideal training signal as known a priori and for calculating updated tap weights of the multiple-tap digital filter used for amplitude-and-group-delay equalization. The structure is similar to that used in equalizer integrated circuits commercially available off-the-shelf except that the circuitry for selectively accumulating a training signal and temporarily storing the accumulation results does not respond directly to the FIR filter response but rather to that FIR filter response as synchrodyned to baseband by the complex demodulator 15 and processed to reduce the effects of artifacts of co-channel NTSC interference in the I-channel baseband signal. Alternative configurations for the equalizer 14 separate the functions of ghost-cancellation and equalization to reduce the number of taps in the kernel of the filter used for final amplitude-and-group-delay equalization after ghost-cancellation is carried out by cascaded sparse-kernel filters of finite- and infinite-impulse response types. The equalizer 14 is preferably designed such that after initial determination of equalization filter parameters is done using a training signal to speed up convergence, the filter parameters are adjusted by decision-directed methods operative on all regenerated baseband symbols to improve dynamic operation under changing multipath conditions.

A DTV receiver for the ATSC standard receives 16-level symbols when receiving cablecast and receives 8-level symbols when receiving a through-the-air broadcast via the antenna 10. The concern of the invention is with the reception of terrestrial through-the-air broadcasts, and FIG. 1 does not show the portions of the DTV receiver providing symbol decoding and error-correction decoding for received cablecast transmissions. Equalization and digital demodulation procedures are best implemented with at least 8-bit resolution.

The I-channel baseband signal from the complex demodulator 15 is supplied to a sample clock generator 18 as a synchronizing input signal. The I-channel baseband signal contains a component of signal at half-symbol frequency. This component is selected by finite-impulse-response (FIR) digital bandpass filtering and squared. The squared response is selected by FIR digital bandpass filtering that selects for symbol frequency. Oscillations from a controlled clock oscillator oscillating at a multiple of symbol frequency are frequency divided for comparison to the selected symbol frequency to develop a control signal supplied to the clock oscillator to complete an AFPC loop locking the frequency and phase of the frequency-divided oscillations to the selected symbol frequency. Clock signals from the frequency divider chain in the sample clock generator 18 are supplied to the ADC 13 to time its sampling of the final IF frequency signal supplied to the ADC 13 from the IF amplifier chain 12. In order for the sampling of the final IF frequency signal to be timed so as to minimize intersymbol distortion in the equalized I-channel response, the ADC 13 performs sampling at a multiple of twice symbol rate.

The I-channel baseband signal from the complex demodulator 15 is supplied as input signal to data sync detection circuitry 19. The data sync detection circuitry 19 supplies an operations controller 20 with data segment synchronizing (DSS) signal responsive to a data segment synchronizing code at the beginning of each data segment. The data sync detection circuitry 19 also supplies the operations controller 20 with data field synchronizing (DFS) signal responsive to data field synchronizing code in the first data segment of each data field. A sample counter 21 counts the samples in an integral number N of data frames, and its count is reset to prescribed values responsive to the DFS signals. The count from the sample counter 21 is supplied to the operations controller 20 to be used for timing certain operations.

The FIG. 1 DTV signal receiver includes circuitry for determining whether or not the I-channel baseband signal from the complex demodulator 15 is accompanied by artifacts of NTSC co-channel interference of sufficient strength as to cause uncorrectable error in data-slicing that signal directly, without further processing. The circuitry for evaluating the strength of the NTSC artifacts is of a general type described by A. L. R. Limberg in U.S. patent application Ser. No. 08/821,944 filed Mar. 19, 1997, U.S. Pat. No. 5,801,790, and entitled "USING INTERCARRIER SIGNALS FOR DETECTING NTSC INTERFERENCE IN DIGITAL TV RECEIVERS". The DTV signal, as converted to IF by the DTV receiver "front end" electronics 11, is supplied to an IF amplifier chain 22 of quasi-parallel type for NTSC sound signals. The amplifier stages in the IF amplifier chain 22 for NTSC sound signals correspond to similar amplifier stages in the IF amplifier chain 12 for DTV signals, having substantially linear gain and having the same automatic gain control as the corresponding amplifier stages in the DTV IF amplifier chain 12. The frequency selectivity of the quasi-parallel IF amplifier chain 22 is such as to emphasize response within ±250 kHz of NTSC audio carrier and within ±250 kHz or so of NTSC video carrier. The filtering procedures to establish the frequency selectivity of the IF amplifier chain 22 can be carried out by SAW filtering in a UHF IF amplifier if plural-conversion receiver circuitry is used. The response of the IF amplifier chain 22 is supplied to an intercarrier detector 23 which uses the modulated NTSC video carrier as an exalted carrier for heterodyning the NTSC audio carrier to generate intercarrier sound intermediate-frequency signal with a 4.5 MHz carrier frequency. This intercarrier sound IF signal is amplified by an intercarrier-sound intermediate-frequency amplifier 24, which 4.5 MHz IF amplifier 24 supplies amplified intercarrier sound IF signal to an intercarrier amplitude detector 25 followed by a lowpass filter 26 with a long time constant, and the resulting substantially direct voltage response is supplied to a threshold detector 27. The threshold in the threshold detector 27 is exceeded only if the NTSC co-channel interference is of sufficient strength as to cause uncorrectable error in data-slicing.

The I-channel baseband signal from the complex demodulator 15 is supplied to a rate reduction filter 28 that supplies samples at symbol rate to an adaptive co-channel NTSC artifacts suppression filter 30 comprising elements 31–37. The rate reduction filter 28 is preferably designed not to pass zero-frequency component as caused by synchrodyning of the pilot carrier accompanying the VSB DTV signal. The rate reduction filter 28 response is supplied as minuend input signal to a digital subtractor 31 in the filter 30, which subtractor 31 supplies its difference output signal to a data slicer 32 in the filter 30. A two-input multiplexer 33 in the filter 30 supplies a selected one of its input signals to the subtractor 31 as subtrahend input signal.

Each sample of I-channel baseband signal in the rate reduction filter 28 response is resolved to eight or more bits and is, in effect, a digital description of an analog symbol exhibiting one of eight levels when over-the-air broadcasts are being received or one of sixteen levels when cablecasts are being received. The I-channel baseband signal is carefully gain-controlled by any one of several known methods, so the ideal step levels for symbols are known. This facilitates operation of the data slicer 32, particularly if data slicing is of the so-called "hard" type in which the boundaries between data slices are immutable. One method of gain control, preferred because the speed of response of such gain control is exceptionally rapid, regulates the direct component of the I-channel baseband signal supplied from the complex demodulator 15 to a normalized level of +1.25 where 2 is the interval between levels of baseband symbol coding. This method of gain control resembles that described by C. B. Patel and A. L. R. Limberg in U.S. Pat. No. 5,573,454 issued Jun. 3, 1997, entitled "AUTOMATIC GAIN CONTROL OF RADIO RECEIVER FOR RECEIVING DIGITAL HIGH-DEFINITION TELEVISION SIGNALS", and incorporated herein by reference.

When the threshold detector 27 output signal indicates that artifacts of NTSC co-channel interference accompanying baseband symbol code in the rate reduction filter 28 response are insubstantial and unlikely to affect data-slicing results, the multiplexer 33 is conditioned to reproduce its first input signal, a wired arithmetic zero, as its output signal which is supplied to the digital subtractor 31 as subtrahend input signal. Accordingly, the rate reduction filter 28 response received as minuend input signal by the subtractor 31 is reproduced in its difference signal supplied to the data-slicer 32. The data-slicer 32 supplies 3-parallel-bit groups as symbol decoding results as first input signal to a two-input multiplexer 34.

When the threshold detector 27 output signal indicates that artifacts of NTSC co-channel interference accompanying baseband symbol code in the rate reduction filter 28 response are substantial and likely to affect data-slicing results, the multiplexer 33 is conditioned to reproduce its second input signal in its output signal supplied to the digital subtractor 31 as subtrahend input signal. The second input signal of the multiplexer 33 is a predicted estimate of the current value of the artifact of NTSC co-channel interference accompanying baseband symbol code in the rate reduction filter 28 response, which the subtractor 31 subtracts from the rate reduction filter 28 response it receives as minuend input signal. The difference signal from the subtractor 31 comprises baseband symbol code with substantially no accompanying artifacts of NTSC co-channel interference and is supplied to the data-slicer 32 as its input signal. The difference signal from the subtractor 31 is supplied to the equalizer circuitry 14 for analysis to determine the changes that should be made in the weighting coefficients of its component filters, so that artifacts of NTSC co-channel interference have reduced effect on equalization.

During data portions of all data segment segments except the initial ones of data fields the operations controller 20 responds to the sample count from the counter 21 to condition the multiplexer 34 to reproduce as its output signal the symbol decoding results from the data-slicer 32 supplied to the multiplexer 34 as its first input signal. At times that the data sync detection circuitry 19 should detect data field synchronization information DFS or data segment synchronization information DSS, the operations controller 20 responds to the sample count from the counter 21 to condition the multiplexer 34 to reproduce as its output signal a second input signal supplied to the multiplexer 34 from read-only memory (ROM) within the operations controller 20. This second input signal to the multiplexer 34 comprises the correct values of data field synchronization code in the initial data segment of the data field and the correct values of data segment synchronization code in each and every data segment. When the threshold detector 27 output signal indicates that artifacts of NTSC co-channel interference accompanying baseband symbol code in the rate reduction filter 28 response are substantial and are likely to affect data-slicing results, conditioning the multiplexer 34 to reproduce correct values of DFS and DSS codes in its output signal curtails running errors in the final symbol decoding results that the multiplexer 34 supplies to the data assembler 40, which running errors may arise owing to inaccurate estimates of the artifacts accompanying baseband symbol code in the rate reduction filter 28 response.

The output signal from the multiplexer 34, which comprises the final symbol decoding results in 3-parallel-bit groups, are assembled by a data assembler 40 for application to trellis decoder circuitry 41. Trellis decoder circuitry 41 conventionally employs twelve trellis decoders. The trellis decoding results are supplied from the trellis decoder circuitry 41 to convolutional de-interleaver circuitry 42. Circuitry 42 supplies bytes of Reed-Solomon error-correction coding to Reed-Solomon decoder circuitry 43, which performs Reed-Solomon decoding to generate an error-corrected byte stream supplied to a data de-randomizer 44. Elements 20, 34, and 40–44 are contributory to the circuitry for extracting error-corrected symbol decoding results responsive to the groups of bits the data slicer supplies as data slicing results. The data de-randomizer 44 supplies reproduced data to a data packet sorter 45 which directs each successively received data packet to an appropriate portion of the remainder (not shown) of the receiver. The remainder of a DTV signal receiver in a television set will include an audio decoder, an MPEG-2 decoder and so forth. The remainder of a DTV signal receiver incorporated in a digital tape recorder/reproducer will include circuitry for converting the data to a form for recording.

In FIG. 1 the predicted estimate of the artifacts currently accompanying baseband symbol code in the rate reduction filter 28 response is based on a revised estimate of the artifacts of NTSC co-channel interference accompanying a baseband symbol twelve symbol epochs earlier. The symbol decoding results supplied from the multiplexer 34 address a memory 35 storing a look-up table of the center values for data slices. A digital subtractor 36 receives the rate reduction filter 28 response as minuend input signal. Responsive to the current three-bit symbol decoding result from the multiplexer 34, the memory 35 supplies the subtractor 36 as its subtrahend input signal the center value of the data slice that the input signal to the data-slicer 32 is assumed to be in. The difference output signal from the subtractor 36 is a revised estimate of the artifacts currently accompanying baseband symbol code in the rate reduction filter 28 response. This revised estimate does not affect the data-slicing results already supplied by the data-slicer 32, but is saved for use as a predicted estimate of the artifacts accompanying baseband symbol code in the rate reduction filter 28 response twelve symbol epochs later. That is, the difference output signal from the subtractor 36 is applied to delay circuitry 37 for delaying that signal twelve symbol epochs before application as second input signal to the multiplexer 33. For example, a shift register clocked at symbol rate can provide the delay circuitry 37.

Figure 2:
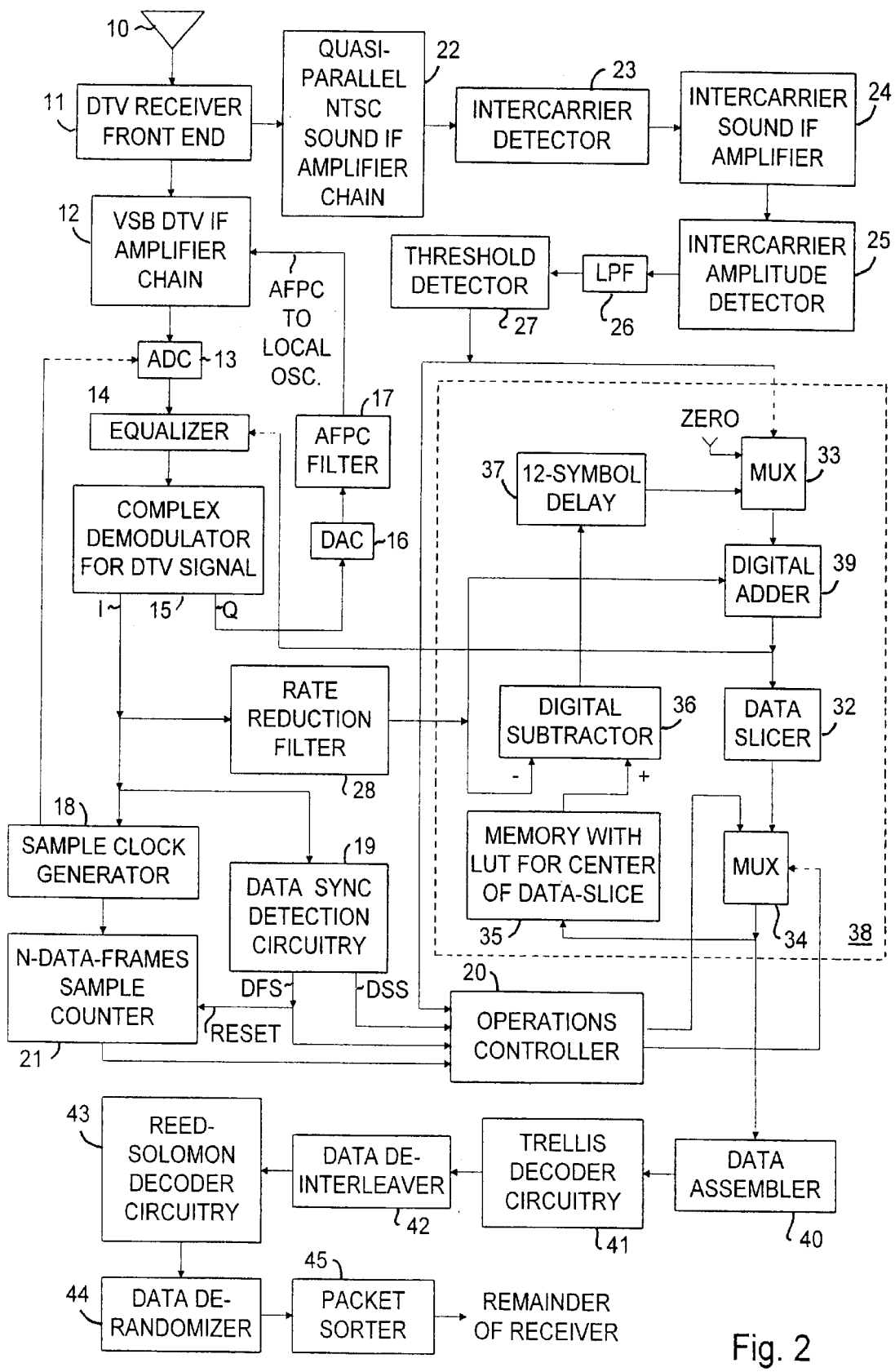
FIG. 2 is a block schematic diagram of an equivalent of the FIG. 1 DTV signal receiver, which equivalent DTV signal receiver embodies the invention.

FIG. 2 shows an equivalent of the FIG. 1 DTV signal receiver, in which the adaptive co-channel NTSC artifacts suppression filter 30 is replaced by an adaptive co-channel NTSC artifacts suppression filter 38. Filter 38 differs from filter 30 in that connections of the minuend and subtrahend input signals to the subtractor 36 are reversed, and in that the subtractor 31 is replaced by a digital adder 38.

Figure 3:
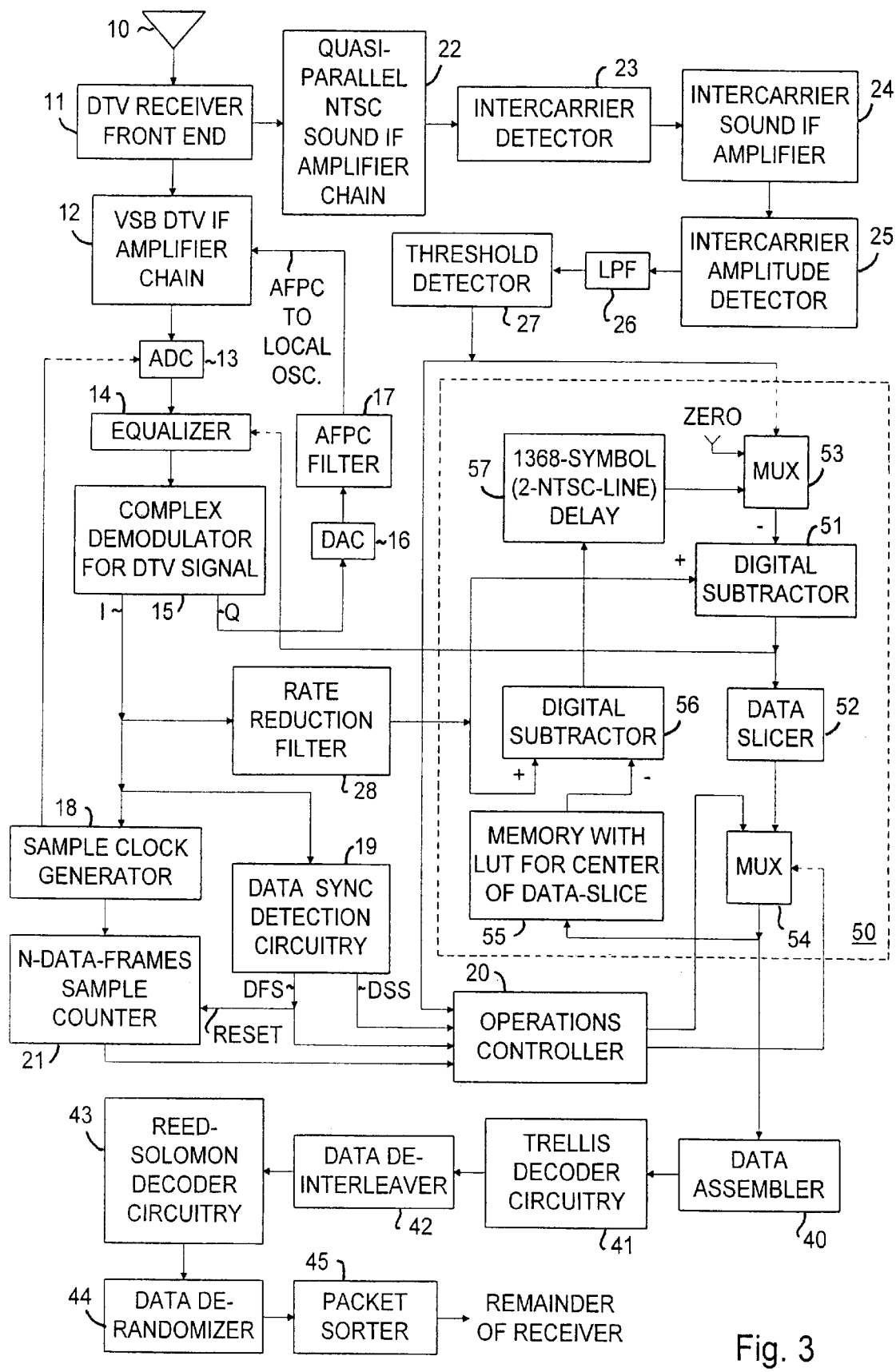
FIG. 3 is a block schematic diagram of a digital television signal receiver embodying the invention, which DTV signal receiver precedes its data-slicer with an adaptive co-channel NTSC artifacts suppression filter that uses a revised estimate of NTSC artifacts accompanying symbol code 1368 epochs (two NTSC scan lines duration) earlier as a preliminary estimate of NTSC artifacts accompanying current symbol code.

FIG. 3 shows a DTV signal receiver differing from that shown in FIG. 1 in that an adaptive co-channel NTSC artifacts suppression filter 50 replaces the adaptive co-channel NTSC artifacts suppression filter 30. Elements 51–56 in the filter 50 correspond to elements 31–36 in the filter 30. The filter 50 differs from the filter 30 in that the delay circuitry 37 for delaying predicted estimates by twelve symbol epochs is replaced by delay circuitry 57 for delaying predicted estimates by 1368 symbol epochs, the duration of two horizontal scan lines of an NTSC analog television signal. Rather than implementing the delay circuitry 57 as a shift register, it can be implemented as a cyclically addressed random-access memory arranged for read-and-then-write-over operation. In the FIG. 3 DTV signal receiver, then, the predicted estimates are generated 1368 symbol epochs before being used to cancel artifacts of co-channel NTSC interference that accompany baseband symbol code in the rate reduction filter 28 response.

Figure 4:
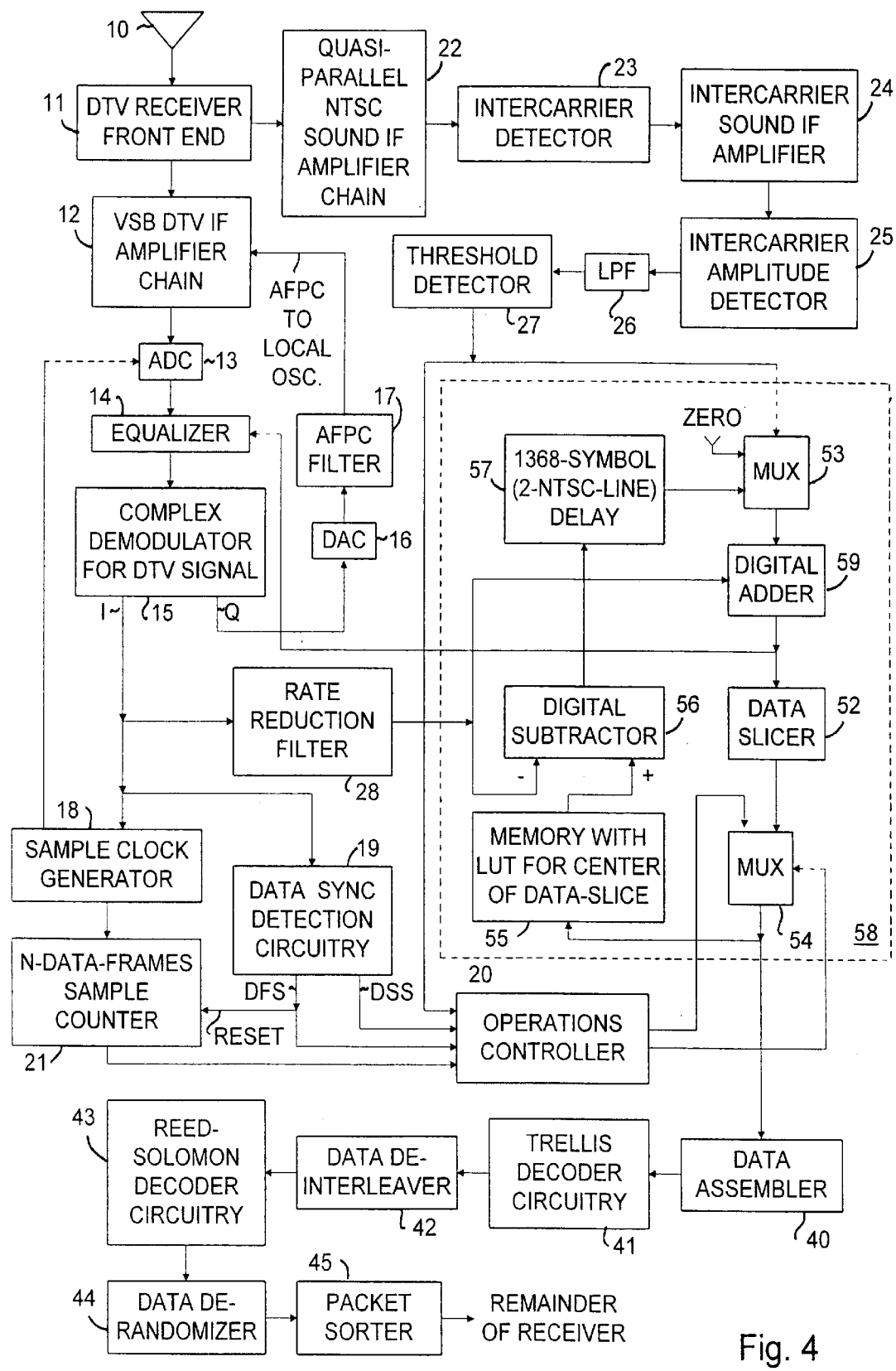
FIG. 4 is a block schematic diagram of an equivalent of the FIG. 3 DTV signal receiver, which equivalent DTV signal receiver embodies the invention.

FIG. 4 shows an equivalent of the FIG. 3 DTV signal receiver, in which the adaptive co-channel NTSC artifacts suppression filter 50 is replaced by an adaptive co-channel NTSC artifacts suppression filter 58. Filter 58 differs from filter 50 in that connections of the minuend and subtrahend input signals to the subtractor 56 are reversed, and in that the subtractor 51 is replaced by a digital adder 58.

Figure 5:
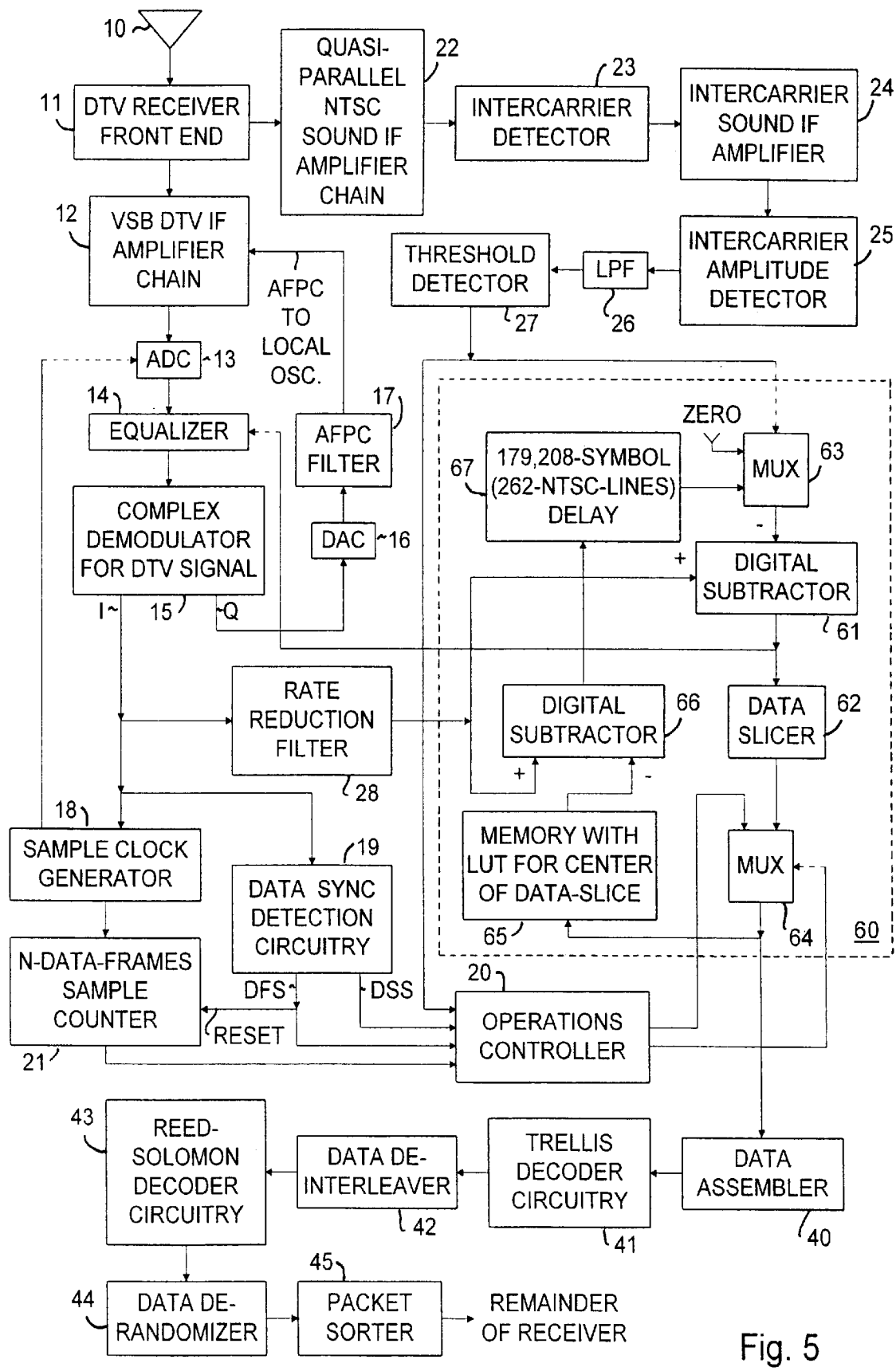
FIG. 5 is a block schematic diagram of a digital television signal receiver embodying the invention, which DTV signal receiver precedes its data-slicer with an adaptive co-channel NTSC artifacts suppression filter that uses a revised estimate of NTSC artifacts accompanying symbol code 179,208 epochs (262 NTSC scan lines duration) earlier as a preliminary estimate of NTSC artifacts accompanying current symbol code.

FIG. 5 shows a DTV signal receiver differing from that shown in FIG. 1 in that an adaptive co-channel NTSC artifacts suppression filter 60 replaces the adaptive co-channel NTSC artifacts suppression filter 30. Elements 61–66 in the filter 60 correspond to elements 31–36 in the filter 30. The filter 60 differs from the filter 30 in that the delay circuitry 37 for delaying predicted estimates by twelve symbol epochs is replaced by delay circuitry 67 for delaying predicted estimates by 179,208 symbol epochs, the duration of 262 horizontal scan lines of an NTSC analog television signal. Rather than implementing the delay circuitry 67 as a shift register, there is considerable power saving by implementing the delay circuitry 67 as a cyclically addressed random-access memory arranged for read-and-then-write-over operation. In the FIG. 3 DTV signal receiver, then, the predicted estimates are generated 179,208 symbol epochs before being used to cancel artifacts of co-channel NTSC interference that accompany baseband symbol code in the rate reduction filter 28 response.

Figure 6:
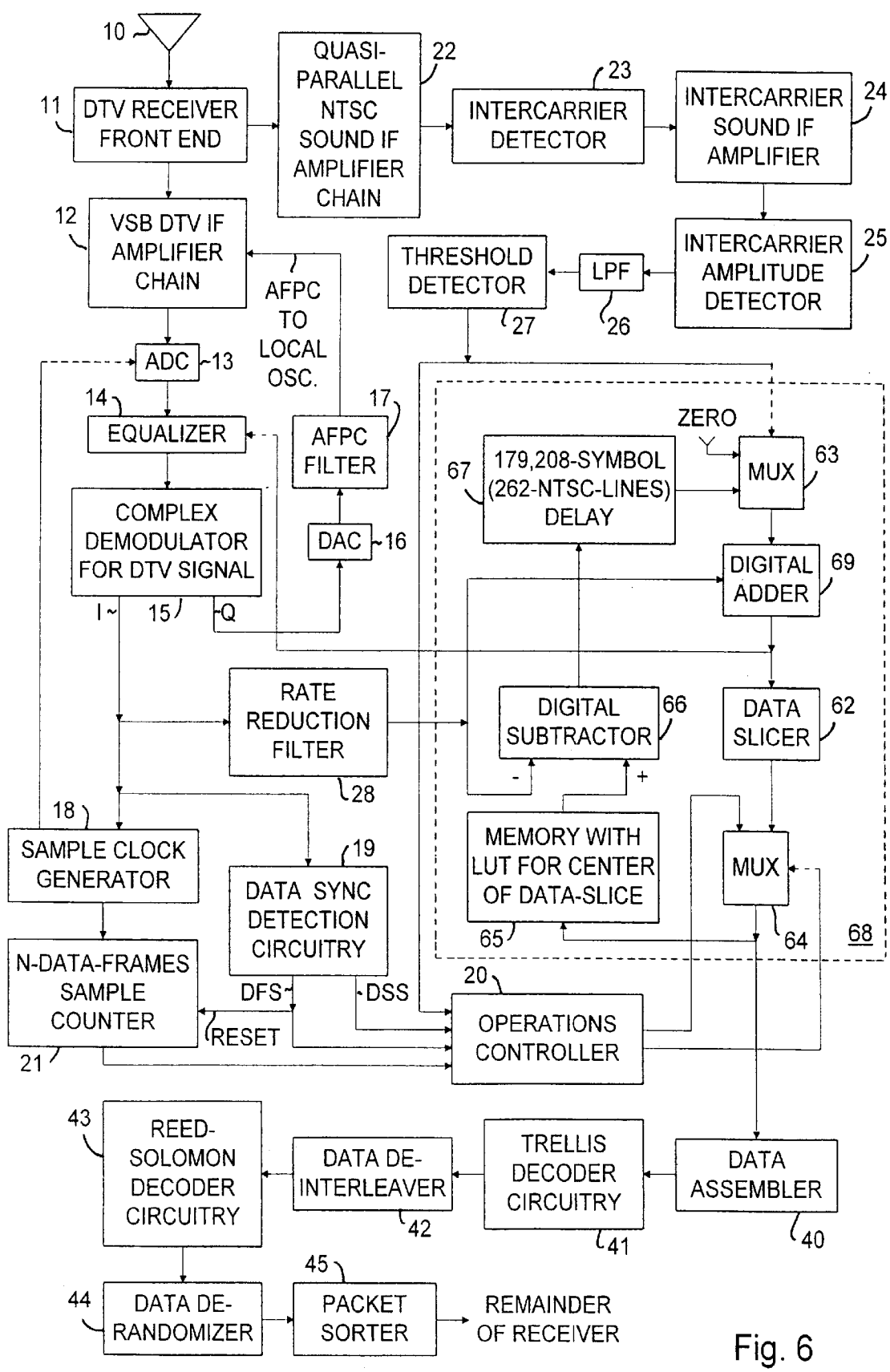
FIG. 6 is a block schematic diagram of an equivalent of the FIG. 5 DTV signal receiver, which equivalent DTV signal receiver embodies the invention.

FIG. 6 shows an equivalent of the FIG. 5 DTV signal receiver, in which the adaptive co-channel NTSC artifacts suppression filter 60 is replaced by an adaptive co-channel NTSC artifacts suppression filter 68. Filter 68 differs from filter 60 in that connections of the minuend and subtrahend input signals to the subtractor 66 are reversed, and in that the subtractor 61 is replaced by a digital adder 69.

Figure 7:
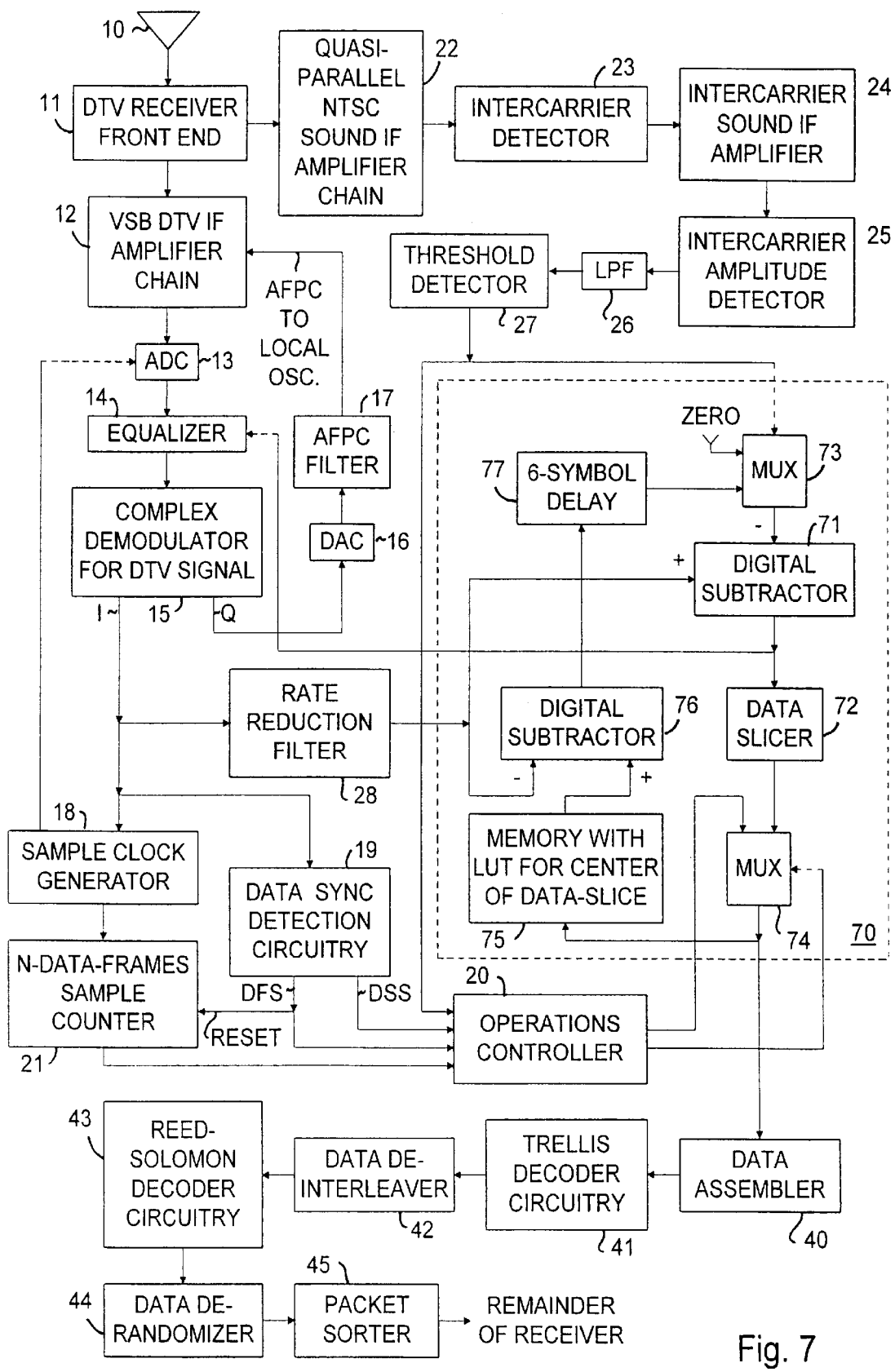
FIG. 7 is a block schematic diagram of a digital television signal receiver embodying the invention, which DTV signal receiver precedes its data-slicer with an adaptive co-channel NTSC artifacts suppression filter that uses a revised estimate of NTSC artifacts accompanying symbol code six epochs earlier as a preliminary estimate of NTSC artifacts accompanying current symbol code.

FIG. 7 shows a DTV signal receiver differing from that shown in FIG. 1 in that an adaptive co-channel NTSC artifacts suppression filter 70 comprising elements 71–77 replaces the adaptive co-channel NTSC artifacts suppression filter 30. Elements 71–75 in the filter 70 correspond to elements 31–35 in the filter 30. The filter 70 differs from the filter 30 in that the subtractor 36 is replaced by a subtractor 76 that receives the rate reduction filter 28 response as subtrahend (rather than minuend) input signal and that receives from the memory 35 as its minuend (rather than subtrahend) input signal the center value of the data slice that the input signal to the data-slicer 72 is assumed to be in.

The difference output signal from the subtractor 76 supplies the revised estimates of the artifacts currently accompanying baseband symbol code. These revised estimates are based on odd multiples of half cycles of the beat frequencies between the digital carrier and the co-channel interfering NTSC video carrier and chroma subcarrier, rather than whole cycles of these beat frequencies. The filter 70 further differs from the filter 30 in that the revised estimate of the artifacts currently accompanying baseband symbol code is delayed six (rather than twelve) symbol epochs. That is, the delay circuitry 37 for delaying predicted estimates by twelve symbol epochs is replaced by delay circuitry 77 for delaying predicted estimates by six symbol epochs.

Figure 8:
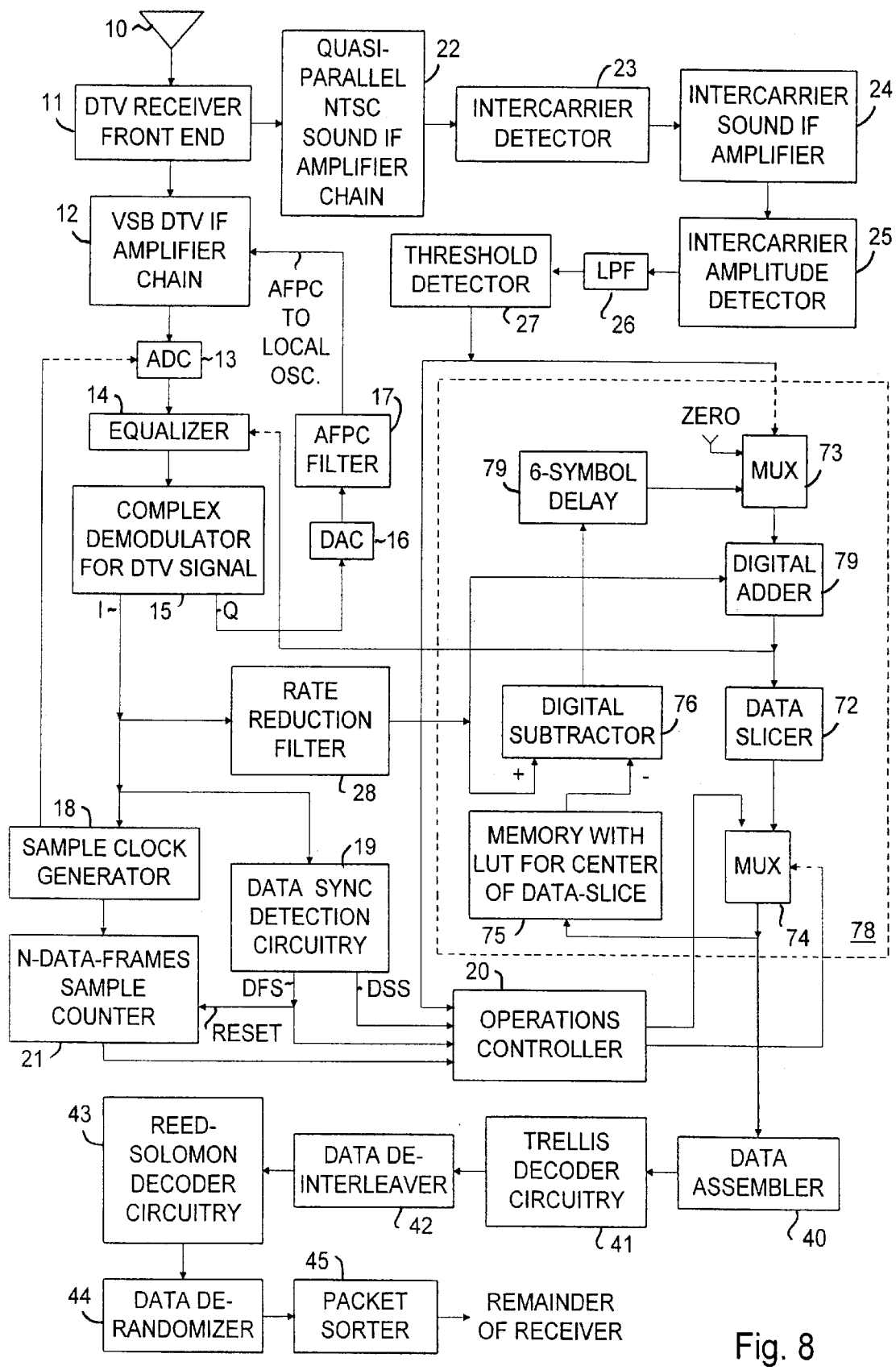
FIG. 8 is a block schematic diagram of an equivalent of the FIG. 7 DTV signal receiver, which equivalent DTV signal receiver embodies the invention.

FIG. 8 shows an equivalent of the FIG. 7 DTV signal receiver, in which the adaptive co-channel NTSC artifacts suppression filter 70 is replaced by an adaptive co-channel NTSC artifacts suppression filter 78. Filter 78 differs from filter 70 in that connections of the minuend and subtrahend input signals to the subtractor 76 are reversed, and in that the subtractor 71 is replaced by a digital adder 79.

Figure 9:
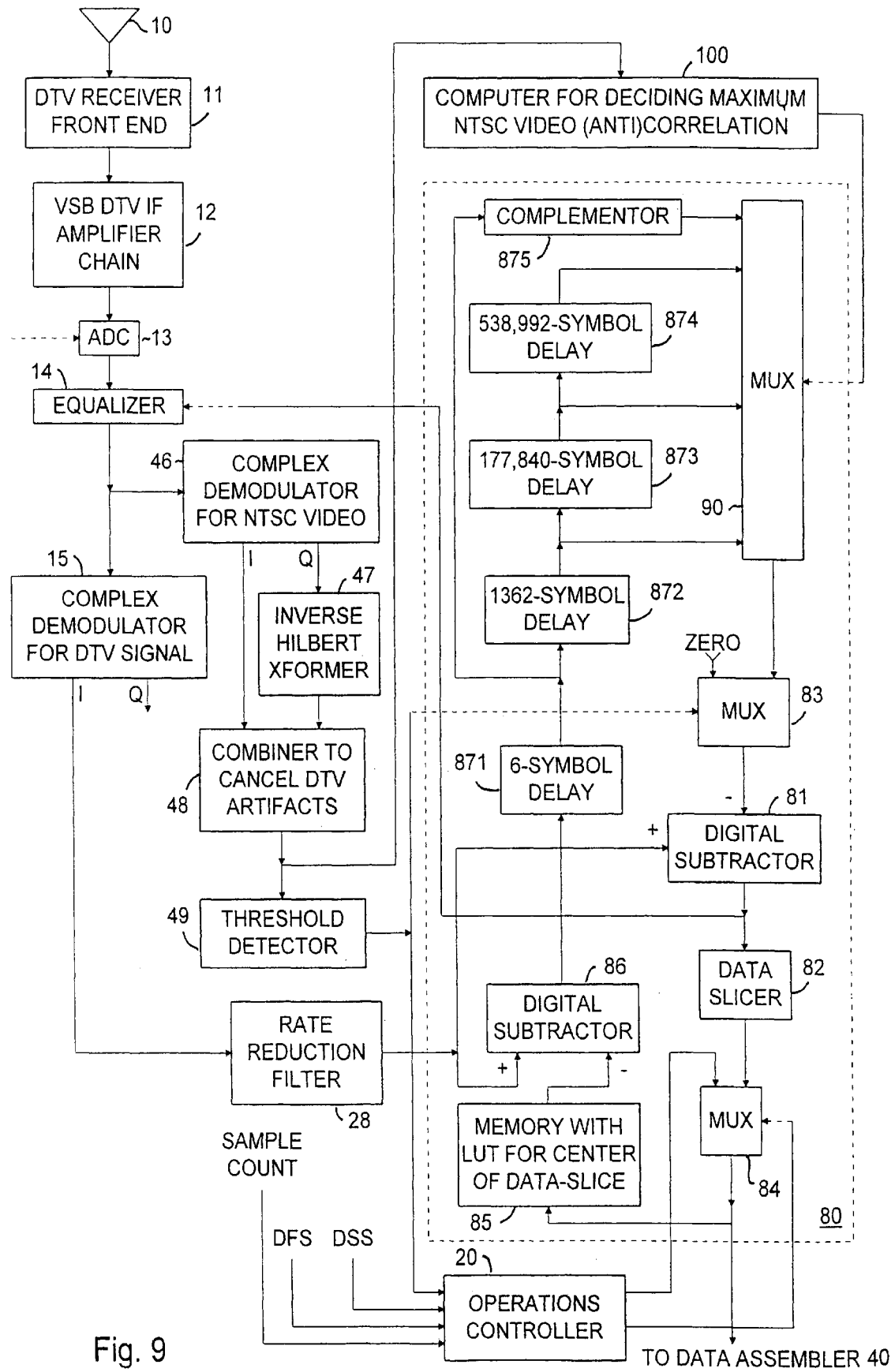
FIG. 9 is a block schematic diagram of a digital television signal receiver embodying the invention, which DTV signal receiver precedes its data-slicer with an adaptive co-channel NTSC artifacts suppression filter that uses a revised estimate of NTSC artifacts accompanying symbol code a selected number of symbol epochs earlier as a preliminary estimate of NTSC artifacts accompanying current symbol code.

FIG. 9 shows a DTV signal receiver in which the data-slicer is preceded by an adaptive co-channel NTSC artifacts suppression filter 80 that uses a revised estimate of NTSC artifacts accompanying symbol code a selected number of symbol epochs earlier as a preliminary estimate of NTSC artifacts accompanying current symbol code. The filter 80 comprises elements 81–86 that correspond to elements 31–36 in the adaptive co-channel NTSC artifacts suppression filter 30 in the FIG. 1 DTV signal receiver. In the FIG. 1 DTV signal receiver the predicted estimate can be founded on a revised estimate from six symbol epochs earlier, from 1368 symbol epochs earlier, from 179,208 symbol epochs earlier, or from 718,200 symbol epochs earlier. The revised estimate of NTSC artifact accompanying a current symbol is generated by the digital subtractor 86. This revised estimate is delayed 718,200 symbol epochs by the cascaded six-symbol-epoch delay circuitry 871, 1362-symbol-epoch delay circuitry 872, 177,840-symbol-epoch delay circuitry 873 and 538,992-symbol-epoch delay circuitry 874 to generate a predicted estimate of NTSC artifact accompanying the $718,200^{th}$ symbol after the current symbol. This revised estimate is delayed 179,208 symbol epochs by the cascaded six-symbol-epoch delay circuitry 871, 1362-symbol-epoch delay circuitry 872 and 177,840-symbol-epoch delay circuitry 873 to generate a predicted estimate of NTSC artifact accompanying the $179,208^{th}$ symbol after the current symbol. The revised estimate of NTSC artifact accompanying a current symbol is delayed 179,208 symbol epochs by the cascaded six-symbol-epoch delay circuitry 871 and 1362-symbol-epoch delay circuitry 872 to generate a predicted estimate of NTSC artifact accompanying the $1368^{th}$ symbol after the current symbol. The revised estimate of NTSC artifact accompanying a current symbol is delayed six symbol epochs by the six-symbol-epoch delay circuitry 871 and the six-symbol-epoch-delayed revised estimate is complemented by a complementor 875 to generate a predicted estimate of NTSC artifact accompanying the sixth symbol after the current symbol. A multiplexer 90 receives the predicted estimates of NTSC artifact accompanying the current symbol as generated six and 1368 and 179,208 and 718,200 symbol epochs earlier. The multiplexer 90 is controlled by multiplexer control signals from a special-purpose computer 100 to select one of these predicted estimates as first input signal for the multiplexer 83. Selection is done according to which estimate is determined least likely to be in error, which determination the computer 100 makes based on baseband NTSC video signal correlation measurements.

The response of the equalizer circuitry 14 is supplied to a complex demodulator 46 that demodulates the equalized vestigial-sideband amplitude-modulation NTSC signal in the final intermediate-frequency band to recover an I-channel baseband video signal by digital in-phase synchronous detection and a Q-channel baseband video signal by digital quadrature-phase synchronous detection. The quadrature NTSC video signal should be zero-valued, but will not be, owing to the presence of co-channel DTV interfering signal and the single-sideband character of higher frequency components of the composite video signal. There is also co-channel DTV interfering signal present in the in-phase NTSC video signal, which should be removed so baseband NTSC video signal correlation measurements will not be affected by the co-channel DTV interference. The NTSC complex demodulator 46 supplies quadrature NTSC video signal to a digital filter 47 having inverse Hilbert transform response to that signal. The filter 47 response is linearly combined with the in-phase NTSC video signal in a linear combiner 48 comprising a digital adder (or subtractor) so as to suppress co-channel DTV interference in a filtered in-phase NTSC video signal the combiner 48 supplies to a threshold detector 49 and to the computer 100. The bandwidth of this filtered in-phase NTSC video signal is about 750 kilohertz, being attributable to those components of the NTSC co-channel interfering signal that are double sideband in nature.

The threshold detector 27 of the DTV signal receivers of FIGS. 1–8 is replaced in the FIG. 9 DTV signal receiver by the threshold detector 49 responding to the filtered in-phase NTSC video signal. When the in-phase NTSC video signal from the combiner 48 is of a level sufficient to generate artifacts that cause significant error during data slicing of DTV signals, the threshold detector 49 supplies the multiplexer 83 a control signal that conditions the multiplexer 83 for supplying predicted estimates of NTSC artifact levels to the subtractor 81 as subtrahend signal. When the in-phase NTSC video signal from the combiner 48 is of a lesser level, the threshold detector 49 supplies the multiplexer 83 a control signal that conditions the multiplexer 83 to supply a zero-valued subtrahend signal to the subtractor 81.

The complex demodulator 15 for DTV signal advantageously uses complex digital carrier generated from sine/cosine look-up tables stored in read-only memory, using techniques of the sort first described by the inventors in U.S. Pat. No. 5,479,449. The complex demodulator 46 for NTSC signal generates complex NTSC video carrier in the analog regime and then digitizes it, since it is impractical to generate this complex carrier from sine/cosine look-up tables stored in read-only memory in addition to the complex digital carrier for DTV demodulation.

Figure 10:
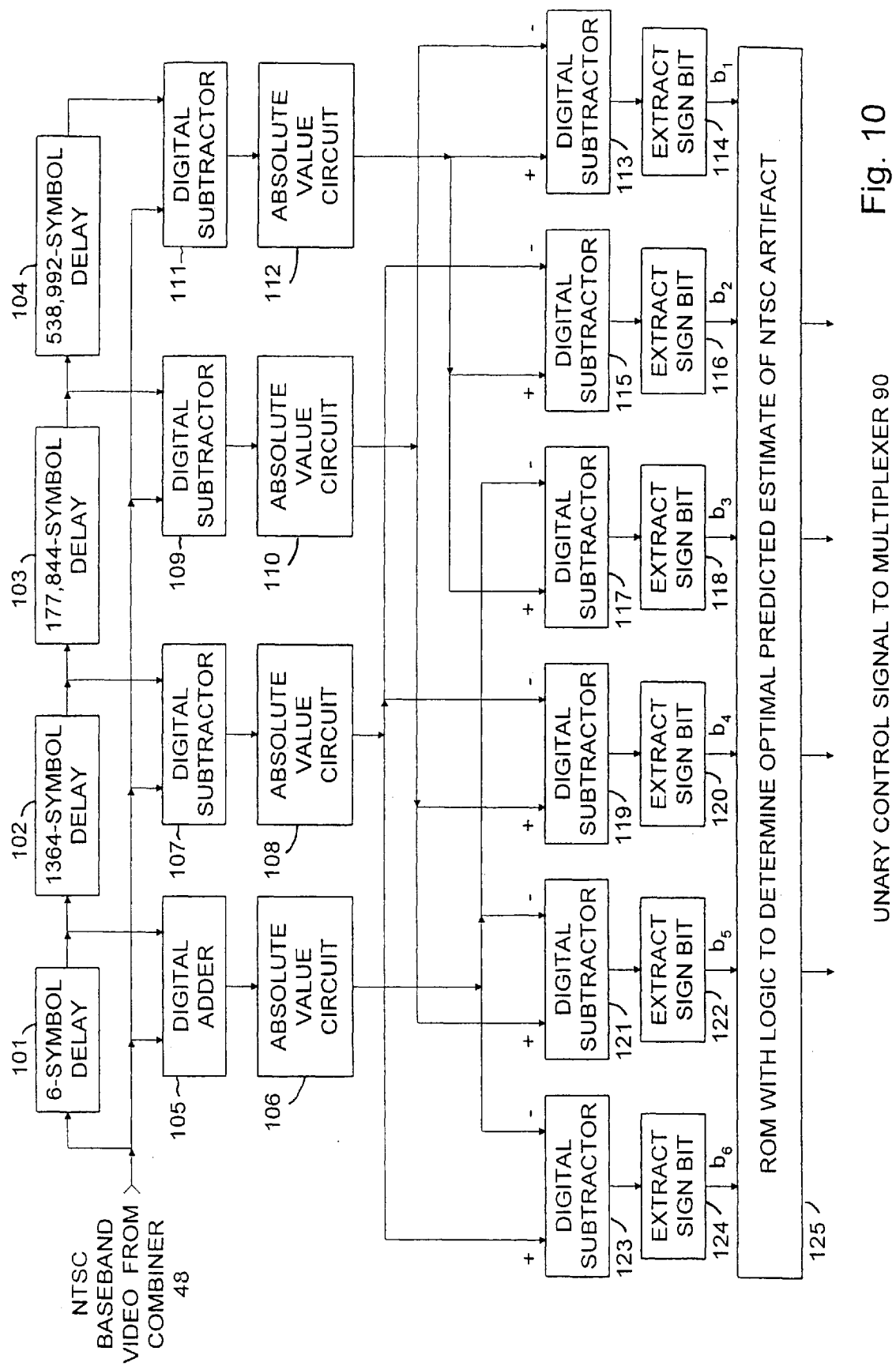
FIG. 10 is a block schematic diagram showing in greater detail a computer for selecting which of various revised estimates of NTSC artifacts accompanying previous symbol code digital television signal receiver is to be used in the FIG. 9 DTV signal receiver as a preliminary estimate of NTSC artifacts accompanying current symbol code.

FIG. 10 shows in detail a possible construction for the computer 100. The filtered in-phase NTSC video signal from the combiner 48 is supplied to a cascade connection of six-symbol-epoch delay circuitry 101, 1362-symbol-epoch delay circuitry 102 and 177,840-symbol-epoch delay circuitry 103 and 538,992-symbol-epoch delay circuitry 104. A digital adder 105 sums the response of the delay circuitry 101 with the filtered in-phase NTSC video signal from the combiner 48, and an absolute value circuit 106 responds to the resulting sum to generate a measure of the lack of anticorrelation of NTSC co-channel interference in symbols six symbol epochs apart. A digital subtractor 107 differentially combines the response of the delay circuitry 102 with the filtered in-phase NTSC video signal from the combiner 48, and an absolute value circuit 108 responds to the resulting difference to generate a measure of the lack of correlation of NTSC co-channel interference in symbols 1368 symbol epochs apart. Another digital subtractor 109 differentially combines the response of the delay circuitry 103 with the filtered in-phase NTSC video signal from the combiner 48, and an absolute value circuit 110 responds to the resulting difference to generate a measure of the lack of correlation of NTSC co-channel interference in symbols 179,208 symbol epochs apart. Yet another digital subtractor 111 differentially combines the filtered in-phase NTSC video signal from the combiner 48 and the response of the delay circuitry 104, and an absolute value circuit 112 responds to the resulting difference to generate a measure of the lack of correlation of NTSC co-channel interference in symbols 718,200 symbol epochs apart.

A digital subtractor 113 receives the response of the absolute value circuit 112 as subtrahend input signal, receives the response of the absolute value circuit 110 as minuend input signal, and has wiring 114 to extract the sign bit of its difference signal. This sign bit is supplied to a read-only memory 125 as a first bit $b_1$ of its address input. The bit $b_1$ is a logic ONE when the correlation of NTSC co-channel interference in symbols 718,200 symbol epochs apart is higher than the correlation of NTSC co-channel interference in symbols 179,208 symbol epochs apart, and is a logic ZERO when the correlation of NTSC co-channel interference in symbols 718,200 symbol epochs apart is lower than or equal to the correlation of NTSC co-channel interference in symbols 179,208 symbol epochs apart.

A digital subtractor 115 receives the response of the absolute value circuit 112 as subtrahend input signal, receives the response of the absolute value circuit 108 as minuend input signal, and has wiring 116 to extract the sign bit of its difference signal. This sign bit is supplied to the read-only memory 125 as a second bit $b_2$ of its address input. The bit $b_2$ is a logic ONE when the correlation of NTSC co-channel interference in symbols 718,200 symbol epochs apart is higher than the correlation of NTSC co-channel interference in symbols 1368 symbol epochs apart, and is a logic ZERO when the correlation of NTSC co-channel interference in symbols 718,200 symbol epochs apart is lower than or equal to the correlation of NTSC co-channel interference in symbols 1368 symbol epochs apart.

A digital subtractor 117 receives the response of the absolute value circuit 112 as subtrahend input signal, receives the response of the absolute value circuit 106 as minuend input signal, and has wiring 118 to extract the sign bit of its difference signal. This sign bit is supplied to the read-only memory 125 as a third bit $b_3$ of its address input. The bit $b_3$ is a logic ONE when the correlation of NTSC co-channel interference in symbols 718,200 symbol epochs apart is higher than the anticorrelation of NTSC co-channel interference in symbols six symbol epochs apart, and is a logic ZERO when the correlation of NTSC co-channel interference in symbols 718,200 symbol epochs apart is lower than or equal to the anticorrelation of NTSC co-channel interference in symbols six symbol epochs apart.

A digital subtractor 119 receives the response of the absolute value circuit 110 as subtrahend input signal, receives the response of the absolute value circuit 108 as minuend input signal, and has wiring 120 to extract the sign bit of its difference signal. This sign bit is supplied to the read-only memory 125 as a fourth bit $b_4$ of its address input. The bit $b_4$ is a logic ONE when the correlation of NTSC co-channel interference in symbols 179,208 symbol epochs apart is higher than the correlation of NTSC co-channel interference in symbols 1368 symbol epochs apart, and is a logic ZERO when the correlation of NTSC co-channel interference in symbols 179,208 symbol epochs apart is lower than or equal to the correlation of NTSC co-channel interference in symbols 1368 symbol epochs apart.

A digital subtractor 121 receives the response of the absolute value circuit 110 as subtrahend input signal, receives the response of the absolute value circuit 106 as minuend input signal, and has wiring 122 to extract the sign bit of its difference signal. This sign bit is supplied to the read-only memory 125 as a fifth bit $b_5$ of its address input. The bit $b_5$ is a logic ONE when the correlation of NTSC co-channel interference in symbols 179,208 symbol epochs apart is higher than the anticorrelation of NTSC co-channel interference in symbols six symbol epochs apart, and is a logic ZERO when the correlation of NTSC co-channel interference in symbols 179,208 symbol epochs apart is lower than or equal to the anticorrelation of NTSC co-channel interference in symbols six symbol epochs apart.

A digital subtractor 123 receives the response of the absolute value circuit 108 as subtrahend input signal, receives the response of the absolute value circuit 106 as minuend input signal, and has wiring 124 to extract the sign bit of its difference signal. This sign bit is supplied to the read-only memory 125 as a sixth bit $b_6$ of its address input. The bit $b_6$ is a logic ONE when the correlation of NTSC co-channel interference in symbols 1368 symbol epochs apart is higher than the anticorrelation of NTSC co-channel interference in symbols six symbol epochs apart, and is a logic ZERO when the correlation of NTSC co-channel interference in symbols 1368 symbol epochs apart is lower than or equal to the anticorrelation of NTSC co-channel interference in symbols six symbol epochs apart.

Figure 11:
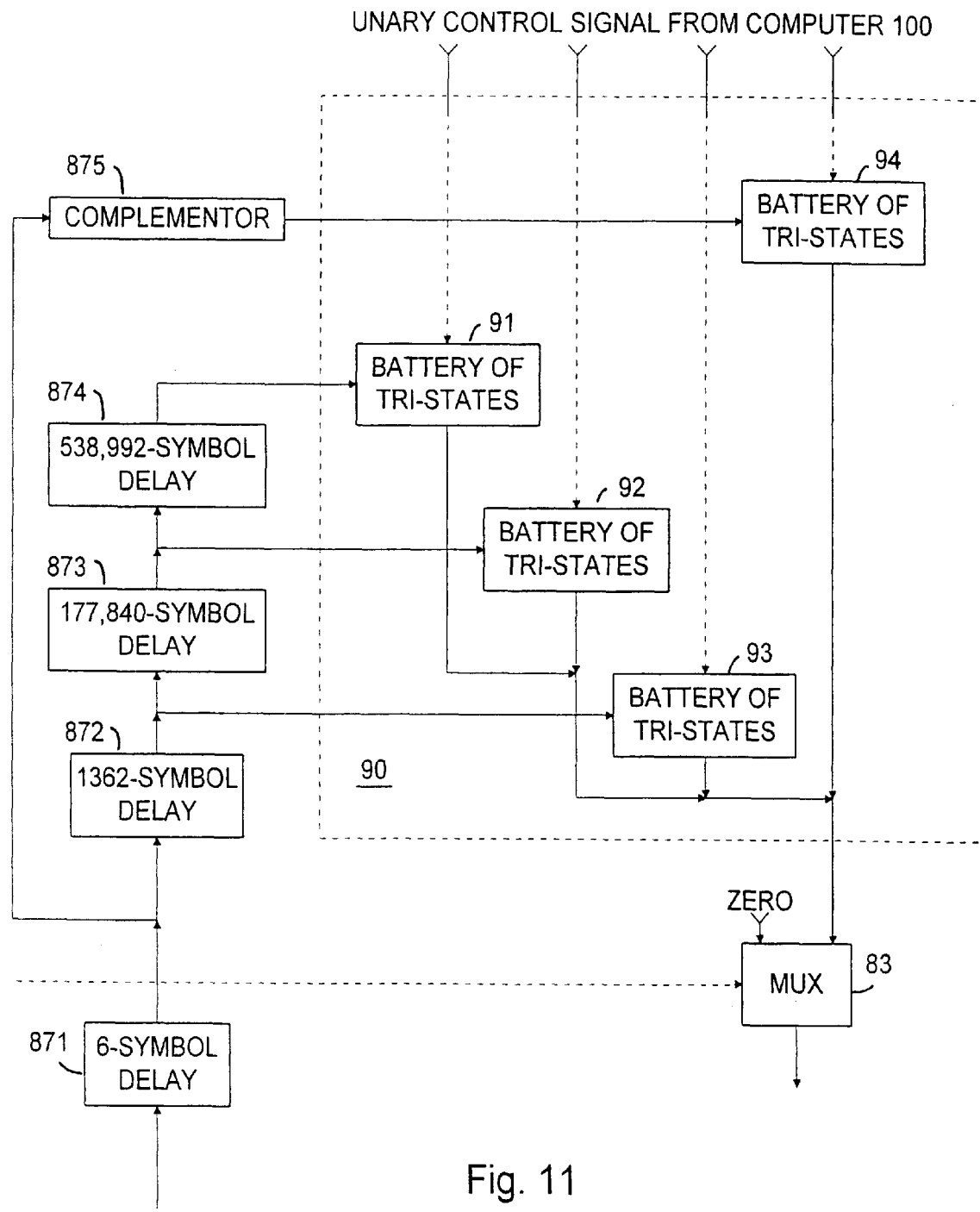
FIG. 11 is a block schematic diagram showing in greater detail the connections of a multiplexer used in the FIG. 9 DTV signal receiver.

The read-only memory 125 stores the look-up tables for logic to determine the optimal predicted estimate of NTSC artifact accompanying a current symbol and generates a 4-bit-wide unary code for controlling the multiplexer 90 of FIGS. 9 and 11. The unary code from read-only memory 125 has a value 1000 as an AND response to $b_3$, $b_2$, and $b_1$. The unary code from read-only memory 125 has a value 0100 as an AND response to $b_5$, $b_4$, and the complement of $b_2$. The unary code from read-only memory 125 has a value 0010 as an AND response to $b_6$, the complement of $b_4$, and the complement of $b_2$. The unary code from read-only memory 125 has a value 0001 an AND response to the complements of $b_6$, $b_5$, and $b_3$—that is, as a NOR response to $b_6$, $b_5$, and $b_3$.

FIG. 11 shows in detail the construction and connections of the multiplexer 90 controlled by the 4-bit-wide unary code generated by the ROM 125. A battery 91 of tri-state circuits, one for each bit in the output signal of the delay circuit 874, asserts the output signal of the delay circuit 874 on the output connection from the multiplexer 90 responsive to the 4-bit-wide unary code generated by the ROM 125 having the value 1000. A battery 92 of tri-state circuits, one for each bit in the output signal of the delay circuit 873, asserts the output signal of the delay circuit 873 on the output connection from the multiplexer 90 responsive to the 4-bit-wide unary code generated by the ROM 125 having the value 0100. A battery 93 of tri-state circuits, one for each bit in the output signal of the delay circuit 872, asserts the output signal of the delay circuit 872 on the output connection from the multiplexer 90 responsive to the 4-bit-wide unary code generated by the ROM 125 having the value 0010. A battery 94 of tri-state circuits, one for each bit in the output signal of the complementor 875, asserts the output signal of the complementor 875 on the output connection from the multiplexer 90 responsive to the 4-bit-wide unary code generated by the ROM 125 having the value 0001.

For portions of the NTSC signal which do not exhibit change over several frames, such as the synchronizing portions of the signal which cause the strongest co-channel interference artifacts in the baseband DTV signal, the optimal predicted estimate of NTSC artifact accompanying a current symbol will often be determined to be the revised estimate from 718,200 symbol epochs before—that is, two NTSC frames previous. If there is noise accompanying the received DTV signal, the optimal predicted estimate of NTSC artifact accompanying a symbol occurring during synchronizing portions of the NTSC signal may be the revised estimate from 179,208 symbol epochs before (that is, 262 NTSC scan lines previous) or from 1368 symbol epochs before (that is, two NTSC scan lines previous). For portions of the NTSC signal which describe changing image, the optimal predicted estimate of NTSC artifact accompanying a current symbol will usually be determined to be the revised estimate from 718,200 symbol epochs before (that is, 262 NTSC scan lines previous), from 1368 symbol epochs before (that is, two NTSC scan lines previous) or from six symbol epochs before.

Modifications of the apparatus described above with reference to FIGS. 9–11 will readily occur to one skilled in the art of television receiver design and acquainted with the foregoing disclosure. For example, the apparatus can be modified so estimates from 718,200 symbol epochs before are not depended on, in order to save the considerable amount of memory associated with the 538,992-symbol-epoch delay circuitry 874 in FIG. 9 and the 538,992-symbol-epoch delay circuitry 104 in FIG. 10. The co-channel NTSC signal as recovered by the combiner 48 can be analyzed to determine when vertical synchronization intervals occur therein and, during horizontal retrace intervals in the NTSC signal, estimates from a prescribed even number (e. g., 30 or 264) of horizontal scan lines before can be chosen so as to ensure cancellation of chroma burst. The apparatus of FIGS. 9–11 can be modified to use estimates from twelve symbol epochs in the past rather than, or in addition to, using estimates from six symbol epochs in the past.

In other embodiments of the invention instead of suppressing artifacts of NTSC co-channel interference in the baseband symbol coding as described above, these artifacts may be suppressed as described by R. W. Citta in U.S. Pat. No. 5,132,797 issued Jul. 21, 1992 and entitled "CO-CHANNEL INTERFERENCE FILTER FOR DIGITAL HIGH DEFINITION TELEVISION RECEIVER", or in U.S. Pat. No. 5,162,900 issued Nov. 10, 1992 and entitled "CO-CHANNEL INTERFERENCE FILTER FOR TELEVISION RECEIVER".

Figure 12:
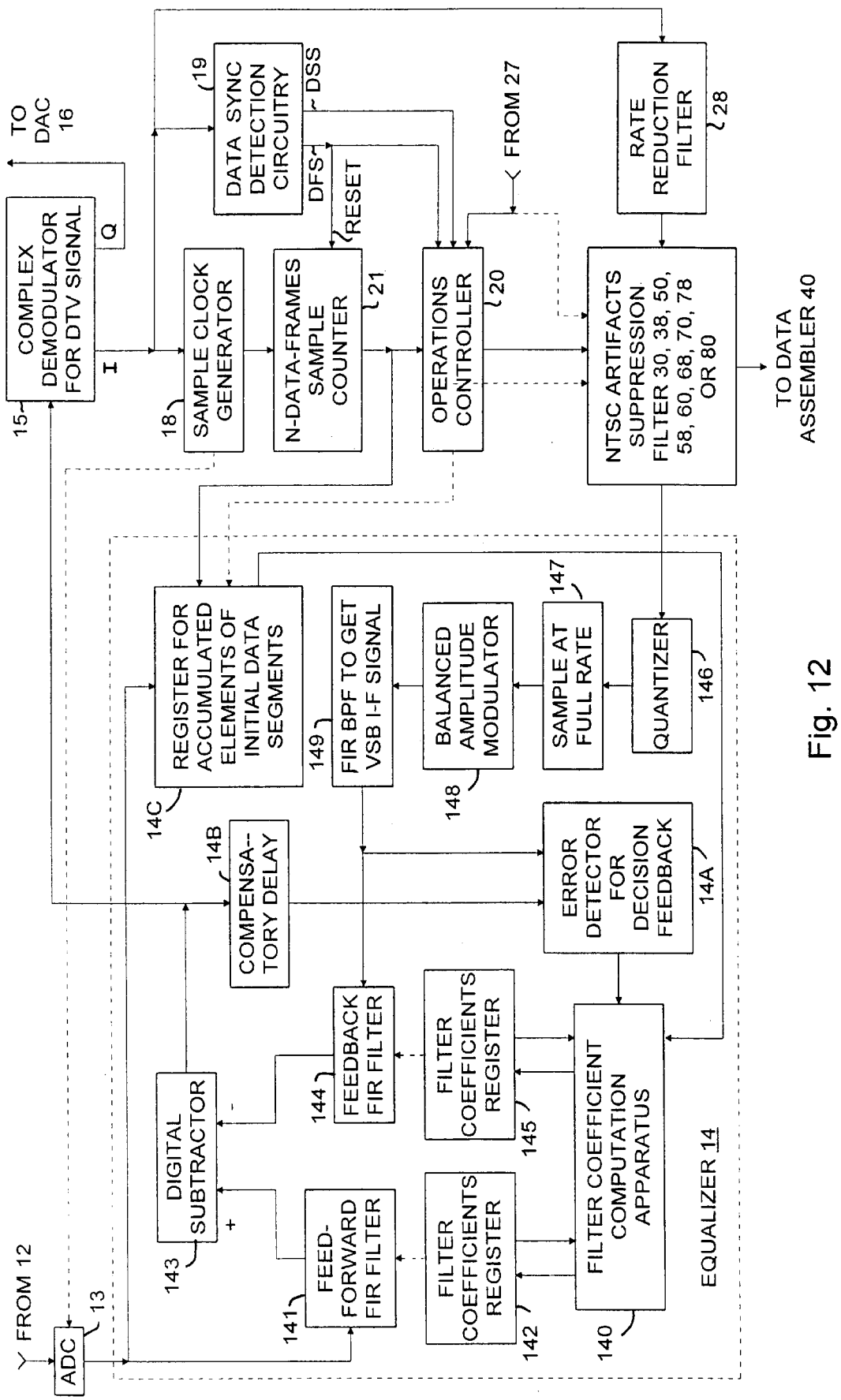
FIG. 12 is a block schematic diagram showing in greater detail a novel type of equalizer that is preferably used in the DTV signal receivers of FIGS. 1–9 to perform equalization on digital intermediate-frequency signals in accordance with the invention.

FIG. 12 shows in some detail how the equalizer 14 is preferably configured. The equalizer 14 includes filter coefficient computation apparatus 140 for computing updated weighting coefficients for the adaptive filtering in the equalizer 14. The equalizer 14 includes a finite-impulse-response (FIR) digital filter 141 having filtering coefficients stored in a temporary storage register 142. The FIR filter 141 is operated as a feedforward FIR filter for suppressing near ghosts and also helps suppress pre-ghosts, multipath responses that are received earlier than the principal DTV signal is received. The feedforward FIR filter 141 is followed by an IIR filter that helps suppress post-ghosts, multipath responses that are received later than the principal DTV signal is received. This IIR filter comprises a digital subtractor 143 and an FIR digital filter 144 having filtering coefficients stored in a temporary storage register 145. The subtractor 143 supplies the IIR filter response as its output signal, which differentially combines the responses of the FIR filters 141 and 144, for application to the complex demodulator 15 as equalized digital final-IF signal input thereto. The FIR digital filter 144 is a feedback filter included in the IIR filter recursion path, which path leads from the difference output port of the subtractor 143 to the input port of the FIR digital filter 144 to close a degenerative feedback loop running through the subtractor 143 and the filter 144.

If prior-art practice in particular regard to passband equalizers were followed, the adjustments of the coefficients of the FIR filters 141 and 144 would be carried out as if their system functions were double-sideband in nature, that is bandpass around a central carrier offset from zero frequency. Also, the recursion path from from the difference output port of the subtractor 143 to the input port of the FIR digital filter 144 would be a direct connection. It is observed by the inventors that multipath is not a problem in which the system function is double-sideband in nature. Rather, the system function as expressed in the frequency regime is single-sideband in nature. Accordingly, the inventors discerned, the adjustments to the weighting coefficients of the FIR filters 141 and 144 should not be bandpass in nature as expressed in the frequency regime; rather they should be lowpass or highpass as referred to zero frequency. That is, while the signals being equalized are passband in nature, the filters used for equalization of these passband signals should have their coefficients adjusted on a baseband basis. This is practical to do with a final-IF band that is offset from zero frequency by a small amount so as to avoid folding of the frequency spectrum of the final-IF signal.

It is known that convergence of the filter coefficients of baseband equalizers by decision feedback methods is facilitated by feeding back noise-free estimates of equalizer response through the feedback FIR filter. Noise-free estimates of equalizer 14 response for application to the input port of the feedback FIR digital filter 144 are generated in the following way by the inventors. The equalizer 14 response supplied from the subtractor 143 as its difference output signal is supplied to the complex demodulator 15 for demodulation. The rate reduction filter 28 reduces to symbol rate the sample rate of the baseband symbol code that the complex demodulator 15 recovers as in-phase demodulation result (I) signal. The I signal from the rate reduction filter 28 is supplied at symbol rate to the NTSC artifacts suppression filter 30, 38, 50, 58, 60, 68, 70, 78 or 80, which NTSC artifacts suppression filter supplies filtered I signal at symbol rate to a quantizer 146. The quantizer 146 generates noise-free estimates of the transmitted symbol code modulation giving rise to the demodulated equalizer response, which estimates are made based on the knowledge of permissible states of this signal. These estimates are made with reasonably high confidence when reception is not exceptionally noisy. These estimates are re-sampled at full sample rate by a re-sampler 147 and then applied as modulating signal to a balanced amplitude modulator 148. The balanced amplitude modulator 148 uses the same digital carrier the complex demodulator 15 uses during demodulation of the VSB DTV signal as translated to final IF band amplitude modulating it to generate a double-sideband amplitude-modulation signal supplied as input signal to a bandpass filter 149. The bandpass filter 149 is an FIR digital bandpass filter responding to its DSB AM input signal with a response that re-generates the VSB DTV signal as estimated to be ideally received and translated to the final-IF band. This regenerated VSB DTV signal is supplied to the input port of the feedback FIR digital filter 144, to close the degenerative feedback loop of the IIR filter portion of the equalizer 14.

The error in the estimates made by the quantizer 146 could be determined by differentially comparing the output signal and input signals of the quantizer 146, as done in prior-art baseband adaptive equalizers in which the weighting coefficients are adjusted by decision-feedback methods. One problem with this error-determination procedure when the adaptive equalizer is operative on passband signals rather than baseband signals is that the error is not correctly determined in regard to the portion of the frequency spectrum near carrier. This lack of correctness arises because of the spectrum folding around zero frequency that takes place during demodulation by the demodulator 15. Another problem is that there is no proper transform procedure for transforming the error signal so determined back to the passband regime. Since the estimates made by the quantizer 146 are not spectrum folded, their use as modulating signal for regenerating the VSB DTV signal transforms the estimates to the passband regime without any incorrectness arising from spectrum-folding.

In order to generate a decision feedback error signal, an error detector 14A compares the estimated VSB DTV signal supplied to the feedback FIR filter 144 input port with the equalizer 14 output signal as supplied from the subtractor 143 output port and delayed before the comparison by delay 14B compensatory for the latent delay through the recursion path from the subtractor 143 output port to the feedback FIR filter 144 input port. This decision feedback error signal contains no incorrectness arising from spectrum-folding. Note that the decision-feedback error signal has full bandwidth, being determined before rate reduction of the equalizer 14 output signal or response thereto.

Decision-feedback methods of adapting the filter coefficients of an adaptive equalizer provide better adaptation to changing multipath conditions than other known methods of adaptatation, but are often subject to problems with establishing initial values of the filter coefficients in reasonably short periods of time—that is, in no more than a few tenths of a second. Preferably, the filter coefficient computation apparatus 140 in the equalizer 14 is arranged in accordance with previous practice to have access to memory that stores the last-calculated weighting coefficients of the equalizer 14 for each channel that can be received in the local reception area in which the DTV receiver is currently situated. When a channel is re-tuned, the last-calculated weighting coefficients for that channel are loaded from that memory into the filter coefficients registers 142 and 145, to provide a best initial estimate of those filter coefficients that will reduce the time for convergence of the coefficients to their final values. The memory for storing last-calculated weighting coefficients for each channel can be associated with channel-skip memory and is preferably associated with memory for storing preferred antenna direction for each channel that can be received in the local reception area. The preferred antenna direction is available to outdoor antenna orientation apparatus. The memory package for tuning can also store codes indicative of whether or not a particular channel has been previously tuned to and indicative of whether a particular channel is received via terrestrial antenna, satellite antenna or cable.

When a channel has not been previously tuned to, or the last-calculated weighting coefficients for the channel are currently incorrect, the filter coefficients of an adaptive equalizer can be more rapidly converged by a training signal method than by decision feedback methods. The training signal is an auxiliary signal periodically inserted into television or other principal transmitted signal so it travels through the same transmission channel as the principal signal. This means that the training signal in the auxiliary transmission is subject to the same multipath or ghosting conditions as the principal transmitted signal. Since the training signal that would be received under ideal conditions is known at the receiver, it can be compared to the training signal that is actually received together with multipath distortion or ghosts of that training signal. This comparison is made to determine the transmission characteristic of the channel, so that a compensating filter can be inserted into the receiver end of the transmission channel to correct the multipath distortion of the training signal. The principal transmitted signal is caused to travel through the same transmission channel and compensating filter as the training signal. So the compensating filter at the receiver corrects the multipath distortion of the principal transmitted signal as well as that of the transmitted training signal.

Since the multipath distortion or ghosts of the training signal that is actually received may have low energy compared to data in the the received signal and to noise accompanying the received signal, it is customary to accumulate the training signal and its multipath distortion or ghosts over several intervals of training signal transmission. The training signal being better correlated from interval to interval than the data and noise which tend to be random in nature gains in relative strength by the accumulation procedure. In DTV receivers the training signal that is generally utilized is a portion of the data field synchronizing (DFS) signal in the initial data segments of data fields, the middle PN63 sequence being the most common choice at the time of this disclosure.

The comparison of the training signal that is actually received with the training signal that would be received under ideal conditions is customarily made utilizing discrete Fourier transform (DFT) methods. The DFT of the training signal that is actually received is divided term-by-term by the corresponding terms of the DFT of the training signal that would be received under ideal conditions to obtain a DFT characterizing the actual channel. The inverse DFT is calculated to return to the time domain, and the complex inverse conjugate of the channel response in the time domain is computed to determine the weighting coefficients of the equalizer.

FIG. 12 shows the equalizer 14 having a register 14C for accumulating the initial data segments of data fields from the equalizer 14 input signal, in order to extract a received training signal with reduced random noise from received DTV signal. The accumulation is done individually for corresponding elements of the respective initial data segments of each data field of a succession of data fields of prescribed number. Accumulation is performed under control of the controller 20. The register 14C comprises at least one random access memory (RAM) addressed by the least significant bits of the sample count supplied by the sample counter 21, which least significant bits count the number of samples per data segment. From more significant bits of the sample count supplied by the sample counter 21, which more significant bits count the number of data segments per data field, the controller 20 detects when the initial data segment of a data field occurs to apply write enable signal to RAM in the register 14C. From the most significant bits of the sample count supplied by the sample counter 21, the controller 20 detects when the prescribed number of data fields over which accumulation is to be done have gone by to apply read enable signal to RAM in the register 14C to forward the accumulated initial data segment data as training signal to the filter coefficient computation apparatus 140.

The derivation of training signal through accumulation of initial data segments of a prescribed number of data fields is generally similar to what is done in regard to obtaining training signal for baseband equalizers. For background with regard to obtaining training signal for baseband equalizers and utilizing the training signal for adapting the equalizer weighting coefficients, the reader is referred to U.S. Pat. Nos. 5,331,416 and 5,600,380. The derivation of training signal through accumulation of initial data segments of a prescribed number of data fields differs from what is done for baseband equalizers in that the accumulation of training signal as received with accompanying multipath distortion is done before demodulation, rather than after demodulation. In order to obtain the DFT of the actual channel preceding the equalizer 14, the DFT of the actually received training signal actually received as accumulated before demodulation is divided term-by-term by the corresponding terms of the DFT of the training signal before demodulation that would be ideally received, rather than by the corresponding terms of the DFT of the training signal after demodulation that would be ideally received.

Whether accumulating training signal in the baseband or in the passband before demodulation, the sampling rate of the data to be accumulated must be such that there are corresponding elements of the initial data segments of the data fields being accumulated. That is, there must be an integral number of samples in each data field of 260,416 symbols. Sampling at higher than symbol rate is desirable to secure the bandwidths required to track changing multipath conditions. If sampling is done at twice symbol rate, there is an integral number 520,832 of samples per field. In order to reduce the number of multipliers in the filters 141 and 144, sparser sampling is desirable. If sampling is done at 1.5 times symbol rate, there is an integral number 390,624 of samples per field.

When accumulating training signal in the baseband, the DTV receiver designer needs only to consider the polarity of the demodulated training signal in determining whether it or its complement is to be accumulated. The polarity of the carrier modulated by the training signal is not of consequence. When accumulating training signal in the passband before demodulation, the DTV receiver designer should take into account the polarity of the carrier as well as of the demodulated training signal. The simplest designs are those that place the VSB DTV carrier near the uppermost frequency in the final IF band and sample so that the carrier phase alternates from sample to sample. The inventors' preference is to have the ADC 13 sample at 1.5 times symbol rate to the equalizer 14 and to generate digital carrier wave for synchrodyning the digitized final IF signal to baseband such that the suppressed carrier of the VSB DTV signal is adjusted to be 8.08 MHz (three-fourths symbol rate) in the final IF band. The polarity of the carrier is the same at times one data field apart, so the sign sequence of signed addition in the accumulation of training signal in the passband before demodulation can the same as in the alternative procedure of accumulation of training signal in the baseband known in the art. Accumulation of initial data segments over a number of data fields that is a multiple of six (e. g., twelve or eighteen) is preferred for tending better to suppress co-channel NTSC energy near video carrier, chroma subcarrier and sound carrier.

Figure 13:
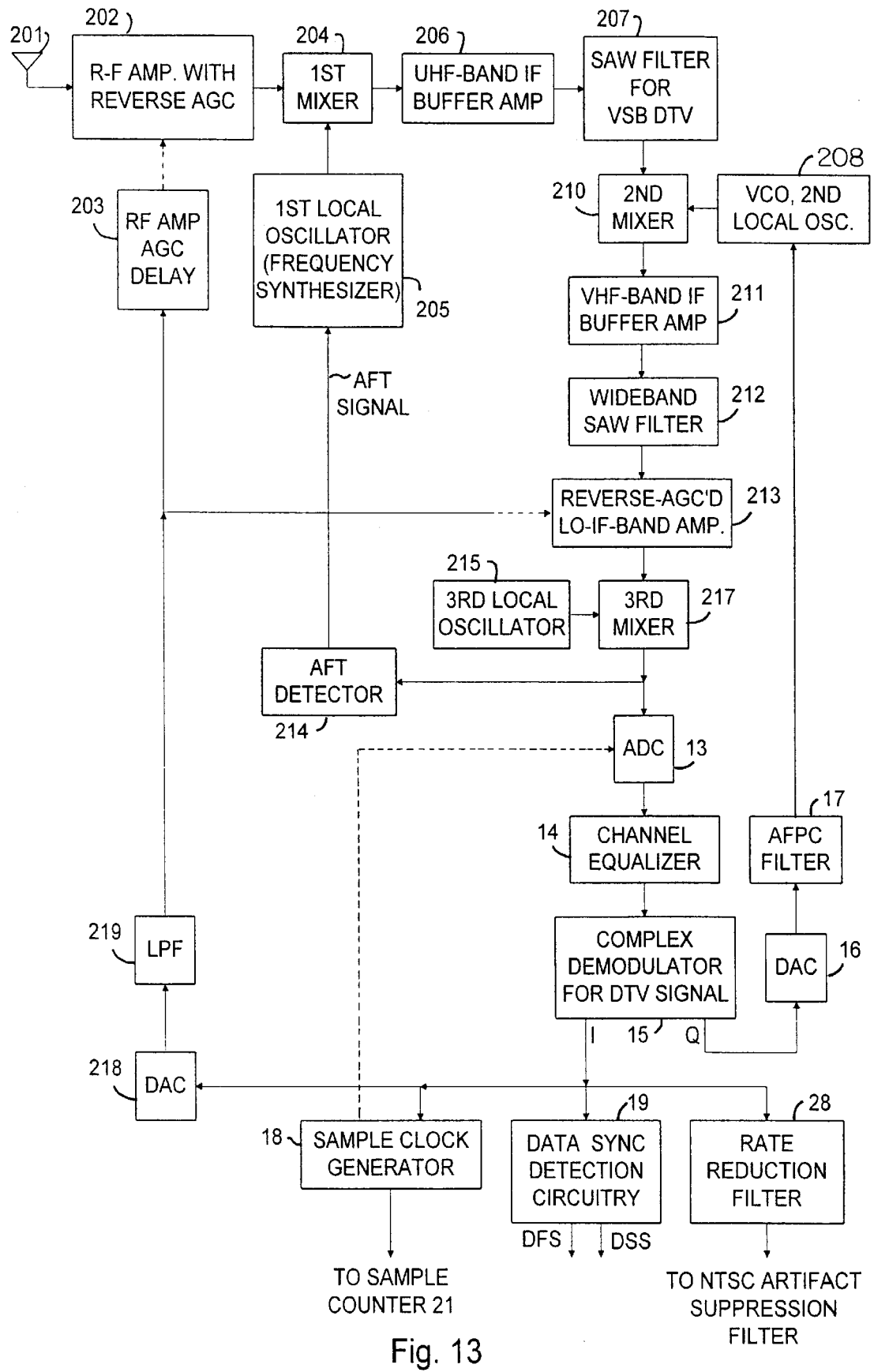
FIG. 13 is a block schematic diagram showing in detail a construction of the tuner of any one of the DTV signal receivers of FIGS. 1–9, which tuner comprises the DTV receiver front end and an IF amplifier chain in which automatic frequency and phase control are applied to the second local oscillator.
Figure 14:
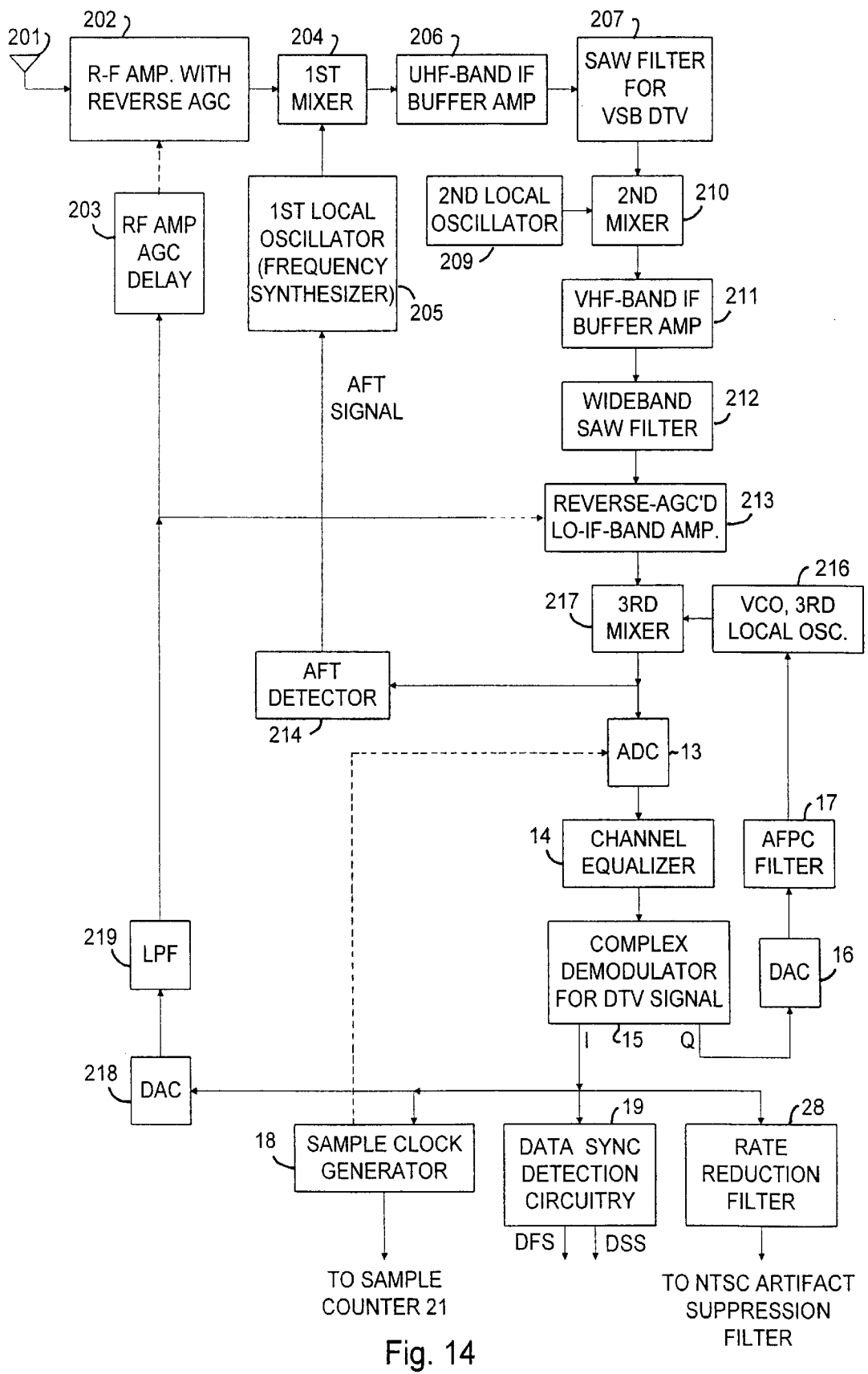
FIG. 14 is a block schematic diagram showing in detail an alternative construction of the tuner of any one of the DTV signal receivers of FIGS. 1–9, which tuner comprises the DTV receiver front end and an IF amplifier chain in which automatic frequency and phase control are applied to the third local oscillator.

FIGS. 13 and 14 show in detail alternative constructions of the DTV receiver front end 11 and VSB DTV IF amplifier chain 12 for a plural-conversion tuner in any of the DTV signal receivers of FIGS. 1–9. Except for the differences as to which local oscillator in the VSB DTV IF amplifier chain 12 is controlled, the constructions are similar so description of them can be combined as follows.

An antenna 201 is a representative source of TV signals in ultra high frequency (UHF) band, or possibly in the very high frequency (VHF) band, which TV signals are applied to a radio-frequency (RF) amplifier 202. The RF amplifier 202 is provided with a tracking preselection filter for selecting a portion of the one of the television broadcast bands the television signal selected for reception reposes in. The RF amplifier 202 is reverse-AGC'd in delayed response to AGC signals applied to RF amplifier 202 via an AGC delay circuit 203. The RF amplifier 202 supplies amplified response to the television signal selected for reception to a first mixer 204.

A first local oscillator 205 with automatic fine tuning (AFT) supplies a super-heterodyning signal to the first mixer 204. In line with current TV practice, the first local oscillator 205 is usually a frequency synthesizer for generating the super-heterodyning signal of a frequency in selected ratio with the frequency of a component controlled oscillator, with the frequency of the controlled oscillator being controlled by AFT signal. This preferred practice results in the sensitivity of the super-heterodyning signal frequency to AFT signal being substantially the same for all received TV channels.

The first mixer 204 mutiplicatively mixes the selected RF signal with the super-heterodyning signal to generate an intermediate-frequency signal in the ultra-high-frequency (UHF) band. The first mixer 204 is preferably of a doubly-balanced linear-multiplication type and comprises an output filter for suppressing the image of that UHF IF signal in its output signal. The 6-MHz-wide selected radio-frequency signal supplied by the RF amplifier 202 is upconverted by the first mixer 204 so as to be nominally centered at an ultra-high frequency above that portion of the UHF band containing assigned channels for television broadcasting, placing the image frequencies well above 1 GHz so they are easily rejected by a bandpass coupling network at the output of the first mixer 204. By way of example, the UHF IF signal can be centered at 920 MHz.

The UHF IF signal supplied from the first mixer 204 is applied via a buffer amplifier 206 to a surface-acoustic-wave (SAW) filter 207 having a substantially linear-phase, flat-amplitude response that has −1 dB to −1 dB bandwidth of 5.7 MHz or so, preferably bounded by a trap for a substantial portion of the subspectrum associated with the frequency-modulated audio carrier of any co-channel interfering NTSC analog TV signal. A SAW filter 207 constructed on a gallium arsenide substrate is capable of providing the desired response to the UHF IF signal. The buffer amplifier 206 provides fixed gain to make up the 10–12 dB insertion loss of the SAW filter 207 and drives the SAW filter 207 from a fixed source impedance chosen to avoid unwanted reflections. The response of the SAW filter 207 and UHF local oscillations from a second local oscillator 208 or 209 are applied as first and second input signals, respectively, to a second mixer 210 for downconverting the SAW filter 207 response to generate a first VHF intermediate-frequency signal.

Departing from the combined description of FIGS. 13 and 14 for a space, the second local oscillator 208 in FIG. 13 is a voltage controlled oscillator. The frequency and phase of the UHF local oscillations from the second local oscillator 208 are controlled by the AFPC signal supplied from the AFPC filter 17. Preferably the natural frequency of the second local oscillator 208 is crystal-stabilized. The second local oscillator 209 in FIG. 14 is a fixed-frequency oscillator. Preferably the natural frequency of the second local oscillator 209 is crystal-stabilized.

Returning to a combined description of FIGS. 13 and 14, the second mixer 210 is preferably of a doubly-balanced linear-multiplication type. The second mixer 210 is for downconverting the response of the SAW filter 207 to a very-high-frequency (VHF) intermediate-frequency signal, typically centered at about 44 MHz as common in analog TV practice. The VHF IF signal supplied from the second mixer 210 is applied via a buffer amplifier 211 to a SAW filter 212 having a substantially linear-phase, flat-amplitude response over a bandwidth in excess of 6 MHz, so that the earlier SAW filter 207 determines the channel characteristics of the IF amplifier chain 12. A SAW filter 212 constructed on a lithium niobate substrate is capable of providing the desired response to the VHF IF signal. The buffer amplifier 211 provides fixed gain to make up the 10–12 dB insertion loss of the SAW filter 212 and drives the SAW filter 212 from a fixed source impedance chosen to avoid unwanted reflections. The SAW filter 212 response to the VHF IF signal supplies the input signal of an automatic-gain-controlled intermediate-frequency amplifier 213.

The response of the AGC'd IF amplifier 213 is supplied to an automatic fine tuning (AFT) detector 214, which responds to the amplified VHF IF signal to supply an automatic fine tuning (AFT) signal to the first local oscillator 205. The response of the AGC'd IF amplifier 213 and VHF local oscillations from a third local oscillator 215 or 216 are applied as first and second input signals, respectively, to a third mixer 217.

The third mixer 217 is for downconverting the amplified VHF IF signal from the AGC'd IF amplifier 213 to generate a final intermediate-frequency signal offset a few MHz from baseband, which final IF signal is supplied to the analog-to-digital converter 13 for digitization. This final IF signal either overlaps the medium-frequency and high-frequency bands or, alternatively, reposes in the high-frequency band.

Departing from the combined description of FIGS. 13 and 14 for a space, the third local oscillator 215 in FIG. 13 is a fixed-frequency oscillator. Preferably the natural frequency of the third local oscillator 215 is crystal-stabilized. The third local oscillator 216 in FIG. 13 is a voltage-controlled oscillator. The frequency and phase of the UHF local oscillations from the third local oscillator 216 are controlled by the AFPC signal supplied from the AFPC filter 17. Preferably the natural frequency of the third local oscillator 216 is crystal-stabilized.

Returning to a combined description of FIGS. 13 and 14, the digitized final IF signal supplied by the ADC 13 is supplied to the channel equalizer 14, which responds to supply a digital equalized final IF signal to the complex demodulator 15. The I-channel baseband signal the complex demodulator 15 recovers by digital in-phase synchronous detection is converted to analog form by a digital-to-analog converter 218, and the resulting analog signal is filtered by a lowpass filter 219 to develop an automatic gain control (AGC) signal for application to the reverse-AGC'd IF amplifier 213 and to the AGC delay circuit 203 for the RF amplifier 202.

What is claimed is:

1. A digital television receiver comprising:
   a tuner for selecting a digital television signal and converting it to a final intermediate-frequency signal with its carrier near one edge of a passband;
   an analog-to-digital converter for digitizing said final intermediate-frequency signal;
   adaptive channel equalization filtering generating an equalized response to said digitized final intermediate-frequency signal for reducing intersymbol interference, said adaptive channel equalization filtering having its filtering parameters adjusted in response to at least portions of regenerated baseband symbol coding transmitted via said digital television signal; and
   a demodulator for demodulating said equalized response to supply said regenerated baseband symbol coding in response to at least portions of which the filtering parameters of said adaptive channel equalization filtering are adjusted.

2. The digital television receiver of claim 1 wherein said final intermediate-frequency signal reposes in a high-frequency band.

3. The digital television receiver of claim 1 wherein said final intermediate-frequency signal overlaps medium-frequency and high-frequency bands.

4. The digital television receiver of claim 1, further comprising:
   a filter for suppressing artifacts of any significantly strong NTSC co-channel interference with said digital television signal that appear in said regenerated baseband symbol coding in response to at least portions of which the filtering parameters of said adaptive channel equalization filtering are adjusted.

5. The digital television receiver of claim 1, wherein said tuner comprises
   a local oscillator receptive of an automatic frequency and phase control signal for controlling the frequency and phase of oscillations from said local oscillator, which oscillations are used in the converting of the selected digital television signal to said final intermediate-frequency signal; wherein said demodulator is a complex demodulator for concurrently performing an in-phase synchronous detection to regenerate baseband symbol coding and a quadrature-phase synchronous detection; and wherein said automatic frequency and phase control signal is generated in response to the results of said quadrature-phase synchronous detection.

6. A digital television receiver comprising:
   a tunable first local oscillator for supplying first local oscillations at any selected one of a plurality of frequencies and
   a first mixer connected for mixing said first local oscillations with a selected digital television signal to generate as a first mixer response an ultra-high-frequency intermediate-frequency signal;
   a first intermediate-frequency amplifier for selecting and amplifying said first mixer response to generate a first intermediate-frequency amplifier response;
   a second local oscillator for supplying ultra-high-frequency second local oscillations the frequency and phase of which are controlled by an automatic-frequency-and-phase-control signal;
   a second mixer connected for heterodyning said first intermediate-frequency amplifier response and said second local oscillations to generate as a first mixer response a very-high-frequency intermediate-frequency signal;
   a second intermediate-frequency amplifier for selecting and amplifying said second mixer response to generate a second intermediate-frequency amplifier response;
   a third local oscillator for supplying very-high-frequency third local oscillations of a prescribed frequency;
   a third mixer connected for heterodyning said second intermediate-frequency amplifier response and said third local oscillations to generate as a third mixer response a final intermediate-frequency signal a few megahertz above zero frequency;

an analog-to-digital converter for digitizing said final intermediate-frequency signal at a rate at least twice the symbol coding rate of said digital television signal;

adaptive channel equalization filtering generating an equalized response to said digitized final intermediate-frequency signal for reducing intersymbol interference, said adaptive channel equalization filtering having its filtering parameters adjusted in response to at least portions of regenerated baseband symbol coding transmitted via said digital television signal; and a complex demodulator for demodulating said equalized response by concurrently performing an in-phase synchronous detection to generate an in-phase baseband response and a quadrature-phase synchronous detection to generate a quadrature-phase baseband response;

filter circuitry for extracting said regenerated baseband symbol coding from said in-phase baseband response of said complex demodulator, said filter circuitry comprising at least a rate reduction filter;

a digital-to-analog converter for converting said quadrature-phase baseband response to an analog digital-to-analog converter response; and an automatic-frequency-and-phase-control filter for supplying said automatic-frequency-and-phase-control signal to said second local oscillator in response to said digital-to-analog converter response.

7. A digital television receiver comprising:

a tunable first local oscillator for supplying first local oscillations at any selected one of a plurality of frequencies and a first mixer connected for mixing said first local oscillations with a selected digital television signal to generate as a first mixer response an ultra-high-frequency intermediate-frequency signal;

a first intermediate-frequency amplifier for selecting and amplifying said first mixer response to generate a first intermediate-frequency amplifier response;

a second local oscillator for supplying ultra-high-frequency second local oscillations of a prescribed frequency;

a second mixer connected for heterodyning said first intermediate-frequency amplifier response and said second local oscillations to generate as a first mixer response a very-high-frequency intermediate-frequency signal;

a second intermediate-frequency amplifier for selecting and amplifying said second mixer response to generate a second intermediate-frequency amplifier response;

a third local oscillator for supplying very-high-frequency third local oscillations, the frequency and phase of which are controlled by an automatic-frequency-and-phase-control signal;

a third mixer connected for heterodyning said second intermediate-frequency amplifier response and said third local oscillations to generate as a third mixer response a final intermediate-frequency signal a few megahertz above zero frequency;

an analog-to-digital converter for digitizing said final intermediate-frequency signal at a rate at least twice the symbol coding rate of said digital television signal;

adaptive channel equalization filtering generating an equalized response to said digitized final intermediate-frequency signal for reducing intersymbol interference, said adaptive channel equalization filtering having its filtering parameters adjusted in response to at least portions of regenerated baseband symbol coding transmitted via said digital television signal; and a complex demodulator for demodulating said equalized response by concurrently performing an in-phase synchronous detection to generate an in-phase baseband response and a quadrature-phase synchronous detection to generate a quadrature-phase baseband response;

filter circuitry for extracting said regenerated baseband symbol coding from said in-phase baseband response of said complex demodulator, said filter circuitry comprising at least a rate reduction filter;

a digital-to-analog converter for converting said quadrature-phase baseband response to an analog digital-to-analog converter response; and an automatic-frequency-and-phase-control filter for supplying said automatic-frequency-and-phase-control signal to said third local oscillator in response to said digital-to-analog converter response.

* * * * *